(12) United States Patent
Hori et al.

(10) Patent No.: US 7,171,477 B2
(45) Date of Patent: Jan. 30, 2007

(54) DATA DISTRIBUTION SERVER, TERMINAL, AND DATA DISTRIBUTION SYSTEM

(75) Inventors: Yoshihiro Hori, Gifu (JP); Seiya Ota, Aichi (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 818 days.

(21) Appl. No.: 10/239,190

(22) PCT Filed: Mar. 26, 2001

(86) PCT No.: PCT/JP01/02432

§ 371 (c)(1),
(2), (4) Date: Sep. 27, 2002

(87) PCT Pub. No.: WO01/74046

PCT Pub. Date: Oct. 4, 2001

(65) Prior Publication Data

US 2003/0105835 A1    Jun. 5, 2003

(30) Foreign Application Priority Data

Mar. 27, 2000    (JP) ............................. 2000-86798

(51) Int. Cl.
*G06F 15/16*    (2006.01)

(52) U.S. Cl. ................ 709/227; 709/231; 455/453
(58) Field of Classification Search ........ 709/227–228, 709/226, 223–224, 231, 217; 455/453
See application file for complete search history.

(56) References Cited

U.S. PATENT DOCUMENTS

| 6,085,222 | A  | * | 7/2000  | Fujino et al. ............... 709/202 |
| 6,167,255 | A  | * | 12/2000 | Kennedy et al. ......... 455/414.1 |
| 6,301,618 | B1 | * | 10/2001 | Sitaraman et al. .......... 709/227 |
| 6,885,362 | B2 | * | 4/2005  | Suomela ..................... 345/156 |

FOREIGN PATENT DOCUMENTS

JP    8-214086    8/1996

(Continued)

OTHER PUBLICATIONS

Japanese Office Action dated Feb. 28, 2006, issued corresponding Japanese Application No. 2001-571640.

*Primary Examiner*—Abdullahi Salad
(74) *Attorney, Agent, or Firm*—Westerman, Hattori, Daniels & Adrian LLP

(57) ABSTRACT

A data delivery server (18) includes a download server (24), and a mobile telephone (12) is connected to the download server (24) via an Internet (20), a mobile telephone network (16), and a radio base station (14). The mobile telephone (12) is capable of downloading desired music data from the data delivery server (18). More specifically, a menu server (22) determines one access point where traffic is not congested based on a connection situation to the access point of the download server (24), and transmits to the mobile telephone (12) download information including a content ID which recognizes a determined access point and the desired music data. Therefore, the mobile telephone (12) is capable of downloading the music data by connecting it to the download server (24) from the access point where traffic is not congested based on the download information. Thus, a required time for downloading cannot be longer than necessary.

4 Claims, 13 Drawing Sheets

FOREIGN PATENT DOCUMENTS

| | | |
|---|---|---|
| JP | 8-286681 | 11/1996 |
| JP | 9-81513 | 3/1997 |
| JP | 10-105500 | 4/1998 |
| JP | 10-304460 | 11/1998 |
| JP | 11-003317 | 1/1999 |
| JP | 11-027648 | 1/1999 |
| JP | 11-69010 | 3/1999 |
| JP | 11-155030 | 6/1999 |
| JP | 11-164058 | 6/1999 |
| JP | 11-328850 | 11/1999 |

* cited by examiner

DATA DISTRIBUTION SERVER, TERMINAL, AND DATA DISTRIBUTION SYSTEM

TECHNICAL FIELD

The present invention relates to a data delivery server, a terminal, and a data delivery system using the same. More specifically, the present invention relates to a data delivery server, a terminal, and a data delivery system using the same, which transmits content data such as music data, image data and so on to a terminal via a telephone network from a download server, for example.

PRIOR ART

Such a kind of a conventional data delivery terminal is a computer such as a personal computer (PC), and connects it to an Internet via a telephone line, for example and accesses a predetermined homepage so as to download content data such as music data, image data and so on.

However, in this prior art, in a case that there is a rush of accesses to the predetermined homepage, that is, traffic is congested, when downloading the desired content data, it took an excessive amount of time. Thus, its telephone charge was costly. In addition, although it was possible to download the desired content data by re-connecting to the predetermined homepage from a different access point (URL, for example) when the traffic is thus congested, it was bothersome to operate.

SUMMARY OF THE INVENTION

Therefore, it is a primary object of the present invention to provide a data delivery server, a communication terminal, and a data delivery system using the same, capable of downloading without unnecessary operations and also restraining a telephone charge.

A data delivery server according to the present invention comprises: a download server which transmits content data to a communication terminal via a telephone network; at least two access points for accessing the download server; a connection situation detecting means which detects a connection situation of the access points; and a first selecting means which selects one access point where traffic is not congested based on a detection result by the connection situation detecting means.

A data delivery server according to the present invention includes the download server and transmits information (download information) for downloading content data and the content data to the communication terminal such as a mobile telephone, a PHS (personal handy-phone system), or a personal computer or the like from the download server via a telephone network such as a mobile telephone network, a PHS network, and so on. The download server has at least two access points, and the connection situation detecting means detects an access condition (connection situation) to each of the access points, and the first selecting means selects a single access point that traffic is not congested on the basis of the connection situation. Therefore, the connecting information to the access point, that is, the download information including a telephone number, a URL, and so on, for example, is transmitted to the communication terminal, allowing the communication terminal to access the download server via the access point where a traffic is not congested. Thus, a communicating time for downloading the content data is not to be extended by the traffic congestion.

According to the present invention, the access point where traffic is not congested is selected so that it is possible to execute a download by averting the traffic congestion without an unnecessary or additional operation. Thus, it is possible to restrain a telephone charge concerning the download.

In an aspect of the present invention, a holding means holds a candidate of access points corresponding to a calling location (sending or dispatching place) of the communication terminal, which allows a second selecting means to select the candidate of at least two access points in accordance with the calling location of the communication terminal detected by a calling location detecting means. More specifically, in a case that the calling location of the communication terminal is Osaka, a candidate of access points corresponding to Osaka or an area in a relatively near distance (Kyoto, Shiga, Nara, Hyogo, and so on) is selected. The first selecting means selects one access point out of the candidate of access points selected by the second selecting means so that an access point in an area where a communication distance becomes longer such as Hokkaido, Tohoku, Kyushu, and so on is not selected.

In another aspect of the present invention, at least two download servers are provided, and a third selecting means selects one download server from the at least two download servers, and therefore, the second selecting means is capable of selecting a candidate of at least two access points to the one download server selected by the third selecting means according to the calling location of the communication terminal if respective candidates of at least two access points corresponding to the respective download servers and for accessing the respective download servers are held in the holding means.

In a certain embodiment of the present invention, the download servers are provided in such a manner as to cover different areas (prefecture, for example) so that the third selecting means is capable of selecting one download server based on the calling location of the communication terminal. Therefore, it is possible to shorten the telephone communication distance.

In another embodiment of the present invention, download servers are provided in such a manner as to respectively correspond to different content data, and therefore, it is possible to select one download server based on the content data to be transmitted to the communication terminal.

Another invention is a data delivery server, comprising: a download server which transmits to a communication terminal via a telephone network at least one of encrypted content data and license information necessary for reproducing the encrypted content data; at least two access points for accessing the download server; a connection situation detecting means which detects connection situations to the access points; and a first selecting means which selects one access point that a traffic is not congested based on a detection result of the connection situation detecting means.

The data delivery server according to this invention includes the download server, and at least one of the encrypted content data (cipher content data) and the license information necessary for reproducing the encrypted content data is transmitted from the download server to the communication terminal such as a mobile telephone, a PHS or a personal computer or the like via the telephone network such as a mobile telephone network, a PHS network, and so on. That is, in transmitting the encrypted content data and the license information, the communication terminal is capable of obtaining them by downloading the both. In addition, it is also possible to separately transmit the encrypted content data and the license information. Furthermore, the communication terminal can download only the license information from the data delivery server while obtaining the encrypted content data from another data deliver server or an appendix of a magazine such as a CD or the like. Furthermore, the download server has the at least two access points, and the connection situation detecting means detects connection situations to the access points, and the first selecting means selects one access point where a traffic is not congested from the connection situations. Therefore, if the download information including the connection information to this access point, such as a telephone number, a URL, and so on is transmitted to the communication terminal, it is possible for the communication terminal to access the download server via the access point where a traffic is not congested. Thus, a required time for downloading the encrypted content data and the license information is not extended due to the traffic congestion.

According to the present invention, the access point where a traffic is not congested is selected, thus possible to execute downloading by averting the traffic congestion without an unnecessary or additional operation. Accordingly, it is possible to restrain a telephone charge concerning the download.

In a certain aspect of the present invention, a holding means holds candidates of access points corresponding to a calling location (calling place) of the communication terminal, allowing a second selecting means to select a candidate of at least two access points corresponding to the calling location of the communication terminal detected by a calling location detecting means. More specifically, in a case that the calling location of the communication terminal is Osaka, candidates of access points corresponding to Osaka and an area in a relatively near distance (Kyoto, Shiga, Nara, Hyogo, and so on) are selected. The first selecting means selects one access point out of the candidates of access points selected by the second selecting means, and thus, an access point in an area where a telephone communication distance becomes longer such as Hokkaido, Tohoku, Kyushu, and so on is not selected.

In another aspect of the present invention, at least two download servers are provided, and a third selecting means selects one download server from the at least two download servers. Therefore, if candidates of the at least two access points corresponding to the respective download servers and for accessing the respective download servers are held in the holding means, the second selecting means is capable of selecting the candidates of the at least two access points to the one download server selected by the third selecting means according to the calling location of the communication terminal.

In a certain embodiment of the present invention, the download server is provided in such a manner as to cover different areas (prefecture, for example), allowing the third selecting means to select one download server based on the calling location of the communication terminal. Therefore, it is possible to shorten the telephone communication distance.

In another embodiment of the present invention, the download server is provided in such a manner as to respectively correspond to different content data so that it is also possible to select one download server based on the content data to be transmitted to the communication terminal.

A communication terminal according to another invention accesses a download server included in a data delivery server so as to receive and store content data, and comprises: an obtaining means which obtains from the data delivery server download information including at least data information showing content data and access point information showing an access point to the download server; an establishing means which establishes a connection between the download server based on the access point information included in the download information which is obtained by the obtaining means; a transmitting means which transmits to the download server the data information included in the download information when connected to the download server; and a storing means which stores the content data transmitted from the download server.

The communication terminal according to this invention is a communication terminal such as a mobile telephone, a PHS or a personal computer, and capable of receiving and storing the content data transmitted from the download server by connecting to the download server included in the data delivery server. The communication terminal accesses the data delivery server so as to obtain from this data delivery server the download information which includes at least the data information showing the content data to be downloaded and the access point information showing an access point to the download server. The communication terminal establishes a connection between the download server based on the access point information included in the download information. More specifically, the communication terminal connects itself to the download server from the access point indicated by the access point information. The access point is an access point that is selected by the data delivery server and that a traffic is not congested, for example. The communication terminal transmits to the download server the data information included in the download information when connected to the download server. In response thereto, the download server transmits to the communication terminal the content data shown by the data information. The content data thus transmitted is received by the communication terminal, and stored in the storing means.

According to the present invention, it is possible to connect the communication terminal to the download server from the access point where a traffic is not congested, thus possible to download the content data in a short period of time. That is, a telephone charge can be restrained.

A communication terminal according to still another invention is connected to any one of a plurality of download servers included in a data delivery server so as to receive and store content data, and comprises: an obtaining means which obtains download information including at least data information showing content data to be downloaded and access point information which shows an access point to one download server selected by the data delivery server; an establishing means which establishes a connection between one download server based on the access point information included in the download information obtained by the obtaining means; a transmitting means which transmits to the one download server the data information included in the download information when connected to one download server; and a storing means which stores the content data transmitted from the one download server.

The communication terminal according to this invention is a communication terminal such as a mobile telephone, a PHS or a personal computer, and capable of receiving and storing the content data transmitted from the download server by connecting itself to any one of a plurality of download servers included in the data delivery server. The communication terminal accesses the data delivery server so as to obtain from the data delivery server the download information which includes at least the data information showing content data to be downloaded and the access point information showing an access point to the one download server selected by the data delivery server. The communication terminal establishes the connection between the communication terminal and one selected download server based on the access point information included in the download information. More specifically, the communication terminal connects itself to the download server from the access point indicated by the access point information. The access point is an access point that is selected by the data delivery server and that a traffic is not congested, for example. It is noted that the one download server is selected based on a calling location of the communication terminal, the content data to be downloaded or the like, for example. The communication terminal transmits to the download server the data information included in the download information when connected to the download server. In response thereto, the download server transmits to the communication terminal the content data shown by the data information. The content data thus transmitted is received by the communication terminal, and stored in the storing means.

According to the present invention, it is possible to connect to the download server from the access point where the traffic is not congested, thus possible to download the content data in a short period of time. That is, a telephone charge can be restrained.

Another invention is a communication terminal which is connected to a download server included in a data delivery server so as to receive content data and stores the content data into a connected recording medium and comprises: an obtaining means which obtains from the data delivery server download information including at least data information showing content data and access point information showing an access point to the download server; an establishing means which establishes a connection between the download server based on the access point information included in the download information obtained by the obtaining means; a transmitting means which transmits to the download server the data information included in the download information when connected to the download server; a connecting means which connects to the recording medium so as to perform at least transmitting and receiving of the content data; and a storage controlling means which stores into the recording medium connected by the connecting means the content data transmitted from the download server.

The communication terminal according to this invention is a communication terminal such as a mobile telephone, a PHS or a personal computer, and capable of receiving and storing the content data transmitted from the download server into an external recording medium such as a memory card, a memory stick or a hard disk drive or the like by connecting itself to the download server included in the data delivery server. The communication terminal accesses the data delivery server, and obtains from the data delivery server download information including at least the data information showing the content data to be downloaded and the access point information showing the access point to the download server. The communication terminal establishes a connection between the communication terminal and the download server based on the access point information included in the download information. More specifically, the communication terminal connects itself to the download server from the access point indicated by the access point information. The access point is an access point that is selected by the data delivery server and that a traffic is not congested, for example. The communication terminal transmits to the download server the data information included in the download information when connected to the download server. In response thereto, the download server transmits to the communication terminal the content data shown in the data information. The content data thus transmitted is received by the communication terminal, and stored by the storage controlling means in an external recording medium connected by the connecting means which performs at least transmitting and receiving of the content data.

According to the present invention, it is possible to connect the communication terminal to the download server from the access point that a traffic is not congested, thus possible to download the content data in a short period of time. That is, a telephone charge can be restrained.

Another is a communication terminal connected to any one of a plurality of download servers included in a data delivery server so as to receive content data and stores the content data into a connected recording medium, comprising: an obtaining means which obtains download information including at least data information showing content data to be downloaded and access point information which shows an access point to one download server selected by the data delivery server; an establishing means which establishes a connection between one download server based on the access point information included in the download information obtained by the obtaining means; a transmitting means which transmits to the one download server the data information included in the download information when connected to the one download server; and a connecting means which at least performs transmitting and receiving of the content data by connecting to the recording medium; and a storage controlling means which stores into the recording medium connected by the connecting means the content data transmitted from the one download server.

The communication terminal according to this invention is a communication terminal such as a mobile telephone, a PHS or a personal computer, and capable of receiving and storing the content data transmitted from the download server by connecting itself to any one of the plurality of download servers included in the data delivery server. The communication terminal accesses the data delivery server so as to obtain from this data delivery server the download information which includes at least the data information showing the content data to be downloaded and the access point information showing the access point to the one download server selected by the data delivery server. The communication terminal establishes a connection between the communication terminal and the one selected download server based on the access point information included in the download information. More specifically, the communication terminal connects itself to the download server from the access point indicated by the access point information. The access point is an access point that is selected by the data delivery server and that a traffic is not congested, for example. It is noted that the one download server is selected based on a calling location of the communication terminal, the content data to be downloaded or the like, for example. The communication terminal transmits to the download server the data information included in the download information when connected to the download server. In response thereto, the download server transmits to the communication terminal the content data shown by the data information. The content data thus transmitted is received by the communication terminal, and stored by the storage controlling means in the recording medium connected to the communication terminal by the connecting means which performs least performs transmitting and receiving of the content data.

According to the present invention, it is possible to connect the communication terminal to the download server from the access point where a traffic is not congested, thus possible to download the content data in a short period of time. That is, a telephone charge can be restrained.

A data delivery system according to still another invention, comprises: a data delivery server including a download server; and a storing means which stores content data transmitted from the download server, wherein the data delivery server includes at least two access points for accessing the download server, a connection situation detecting means which detects connection situations of the access points, and a first selecting means which selects one access point where a traffic is not congested based on a detection result of the connection situation detecting means.

The data delivery system according to this invention is provided with the data delivery server and a communication terminal such as a mobile telephone, a PHS, a personal computer, and so on. The data delivery server includes the download server, and from this download server, information (download information) for downloading the content data and the content data are transmitted to the communication terminal such as a mobile telephone, a PHS, a personal computer, and so on via a mobile telephone network, a PHS network or the like. The download information and the content data thus transmitted are stored in a storing means of the communication terminal. The download server includes at least two access points, and the connection situation detecting means detects the access situations (connection situations) to the access points, and the first selecting means selects one access point where a traffic is not congested based on the detection result of the connection situations. Therefore, the connection information to the access point, that is, the download information including a telephone number, a URL, and so on is transmitted to the communication terminal, thus enabling the communication terminal to access the download server via the access point where that a traffic is not congested. Accordingly, a telephone communication time during the download of the content data is not extended by the traffic congestion.

According to the present invention, the access point where a traffic is not congested is selected so that it is possible to carry out the download by averting the traffic congestion without an unnecessary or additional operation. Accordingly, a telephone charge can be restrained.

In a certain aspect of the present invention, a holding means holds candidates of access points corresponding to a calling location (calling place) of the communication terminal, allowing a second selecting means to select the candidates of at least two access points corresponding to the calling location of the communication terminal detected by a calling location detecting means. More specifically, in a case that the calling location of the communication terminal is Osaka, the candidates of access points corresponding to Osaka and an area in a relatively near distance (Kyoto, Shiga, Nara, Hyogo, and so on) are selected. The first selecting means selects one access point out of the candidates of the access points selected by the second selecting means, and therefore, an access point in an area where a telephone communication distance becomes longer such as Hokkaido, Tohoku, Kyushu, and so on is not selected.

In another aspect of the present invention, at least two download servers are provided, and a third selecting means selects one download server from the at least two download servers. If the candidate of at least two access points corresponding to the respective download servers and for accessing the respective download servers are held in the holding means, the second selecting means is capable of selecting the candidates of at least two access points to the one download server selected by the third selecting means according to the calling location of the communication terminal.

In a certain embodiment of the present invention, since the download servers are provided in such a manner as to cover different areas (prefecture, for example), allowing the third selecting means to select one download server based on the calling location of the communication terminal. Therefore, it is possible to shorten the telephone communication distance.

In another embodiment of the present invention, the download servers are provided in such a manner as to respectively correspond to different content data, so that it is possible to select one download server based on the content data to be transmitted to the communication terminal.

Another invention is a data delivery server comprising: a data delivery server including a download server; and a communication terminal provided with a storing means which stores encrypted content data and license information transmitted from the download server, wherein the data delivery server includes at least two access points for accessing the download server; a connection situation detecting means which detects a connection situations to the access points; and a first selecting means which selects one access point where a traffic is not congested based on a detection result of the connection situation detecting means.

The data delivery system according to this invention is provided with the data delivery server and the communication terminal such as a mobile telephone, a PHS, or a personal computer, or the like. The data delivery server includes the download server, and from this download server, at least one of encrypted content data (cipher content data) and license information necessary for reproducing the encrypted content data are transmitted to the communication terminal such as a mobile telephone, a PHS, or a personal computer, and the like via telephone network such as a mobile telephone network, a PHS network or the like. That is, in a case of transmitting the encrypted content data and the license information, the communication terminal can obtain them by downloading both of them. In addition, it is possible to separately transmit the encrypted content data and the license information. Furthermore, the communication terminal is capable of downloading the license information only from the data delivery server while the encrypted content data is obtained from another data delivery server or an appendix of a magazine such as a CD. The downloaded encrypted content data and the license information are stored in the storing means of the communication terminal. Also, the download server has at least two access points, and the connection situation detecting means detects connection situations to the access points, and the first selecting means selects one access point where a traffic is not congested from the connection situations. Therefore, it is possible for the communication terminal to access the download server via the access point where a traffic is not congested if connecting information to the access point, that is, the download information including a telephone number, a URL, and so on is transmitted to the communication terminal. Accordingly, a required time for downloading the encrypted content data and the license information is not extended as a result of the traffic congestion.

According to the present invention, the access point where a traffic is not congested is selected, and therefore, it is possible to carry out the download by averting the traffic congestion without an unnecessary or additional operation. Accordingly, a telephone charge can be restrained.

In a certain aspect of the present invention, a holding means holds candidates of the access points corresponding to a calling location (calling place) of the communication terminal, allowing a second selecting means to select the candidates of at least two access points corresponding to the calling location of the communication terminal detected by a calling location detecting means. More specifically, in a case that the calling location of the communication terminal is Osaka, the candidates of access points corresponding to Osaka and an area in a relatively near distance (Kyoto, Shiga, Nara, Hyogo, and so on) are selected. The first selecting means selects one access point out of the candidates of the access points selected by the second selecting means, and therefore an access point in an area where a telephone communication distance becomes longer such as Hokkaido, Tohoku, Kyushu, and so on is never selected.

In another aspect of the present invention, at least two download servers are provided, and a third selecting means selects one download server from at least two download servers, so that if the candidates of the at least two access points corresponding to the respective download servers and for accessing the respective download servers are held in the holding means, the second selecting means is capable of selecting the candidates of the at least two access points to the one download server selected by the third selecting means according to the calling location of the communication terminal.

In a certain embodiment of the present invention, the download servers are provided in such a manner as to cover different areas (prefecture, for example), allowing the third selecting means to select one download server based on the calling location of the communication terminal. Therefore, it is possible to shorten the telephone communication distance.

In another embodiment of the present invention, the download servers are provided in such a manner as to respectively correspond to different content data so that it is possible to select one download server based on the content data transmitted to the communication terminal.

The above described objects and other objects, features, aspects and advantages of the present invention will become more apparent from the following detailed description of the present invention when taken in conjunction with the accompanying drawings.

BEST MODE FOR EMBODYING THE INVENTION

Figure 1:
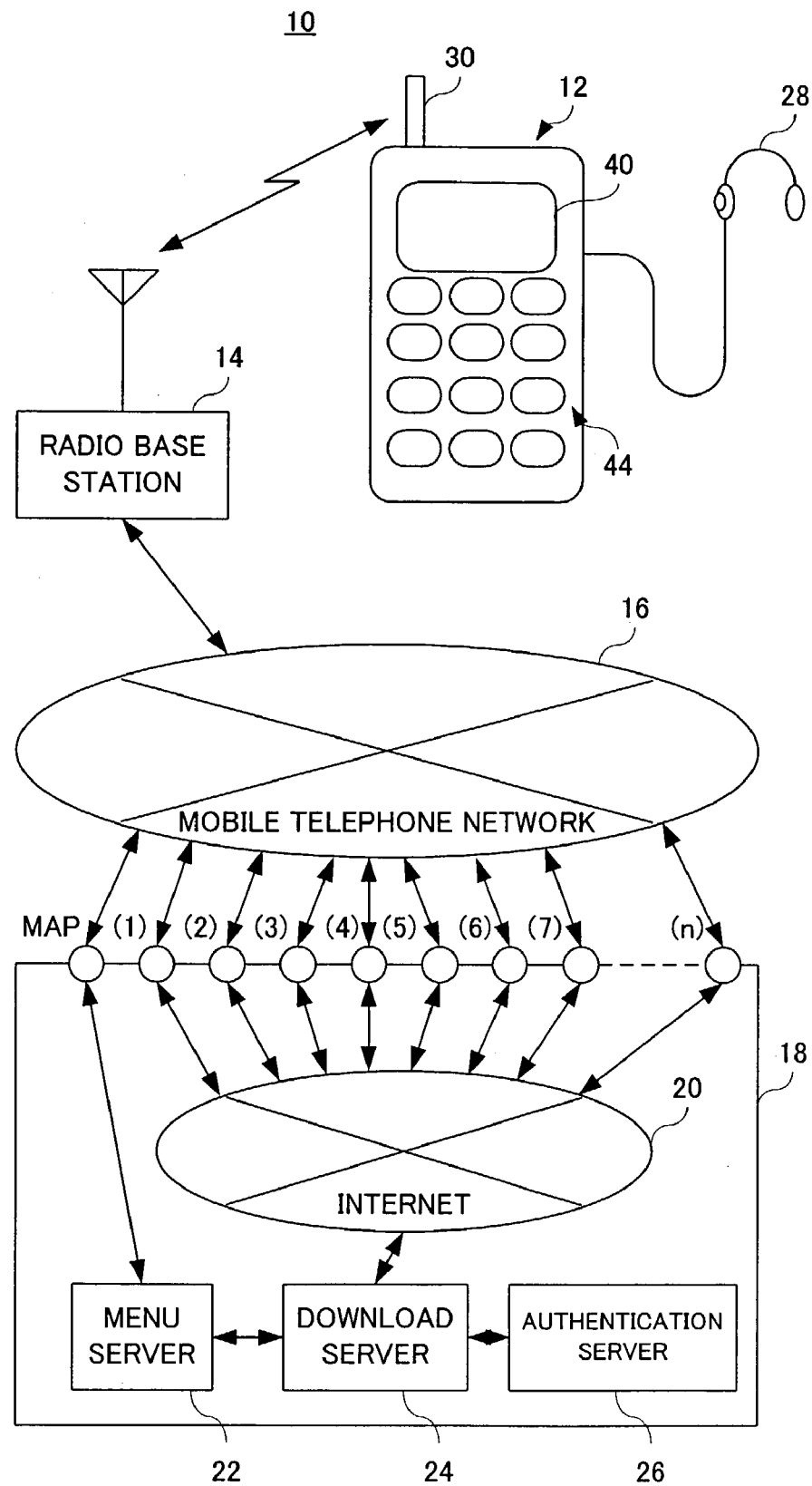
FIG. 1 is an illustrative view showing one embodiment of the present invention.

Referring to FIG. 1, a download system 10 of this embodiment includes a mobile telephone 12, and the mobile telephone 12 is connected to a delivery server 18 via a radio base station 14 and a mobile telephone network 16. The delivery server 18 includes a menu server 22, a download server 24, and an authentication server 26. The menu server 22 and the download server 24 are connected to be communicated with each other, and also the download server 24 and the authentication server 26 are connected to be communicated with each other. Furthermore, the menu server 22 is connected to the mobile telephone network 16 via an access point MAP, and the download server 24 is connected to the mobile telephone network 16 via an Internet 20 and a plurality of access points DAP(1)~DAP(n). It is noted that an Intranet may be provided in place of the Internet.

Moreover, the mobile telephone 12 can access the download server 24 by dialing to any one of DAP-TEL(1)~DAP-TEL(n) that is connection information to the access points DAP(1)~DAP(n). It is noted that n is a natural numeral of 2 or greater. It is also noted that in FIG. 1, respective access points are indicated by circles (o), and only the numbers ((1)~(n)) assigned on its upper left are shown. Furthermore, the access points DAP(1)–DAP(n) are provided area by area, that is, prefecture by prefecture, for example, and the connection information DAP-TEL(1)~DAP-TEL(n) for respectively connecting thereto are a telephone number or a URL.

Figure 2:
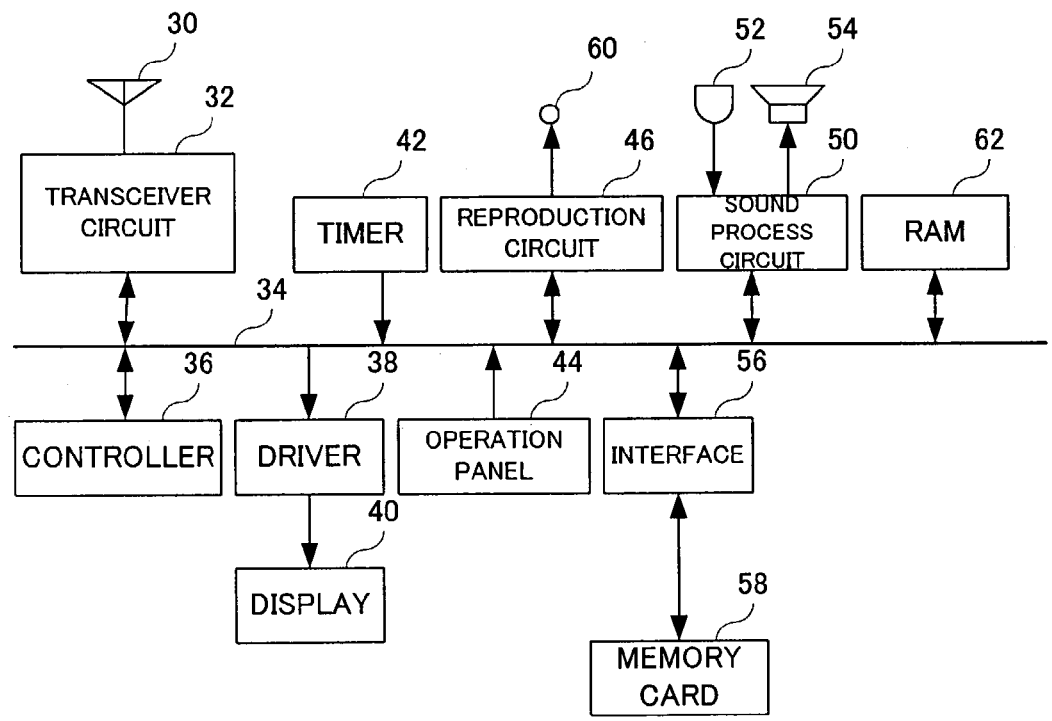
FIG. 2 is an illustrative view showing structure of a mobile telephone shown in FIG. 1 embodiment.

Referring to FIG. 2, the mobile telephone 12 includes an antenna 30, and the antenna 30 is connected to a transceiver circuit 32. The transceiver circuit 32 is connected to a controller 36 via an internal bus 34 (hereinafter briefly referred to as "bus"). The controller 36 carries out a called side process in response to a calling of a communicating partner. That is, the controller 36 controls a sound processing circuit 50 so as to output from a speaker 54 an incoming call tone or an incoming call melody. A user recognizes "an incoming call (call)" by the incoming call tone or the incoming call melody, and inputs an incoming-call operation by using an operation panel 44. Therefore, a connection state is established, allowing the controller 36 to carry out a telephone communication process. That is, an audio signal of the communicating partner is received by the antenna 30, fetched into the controller 36 via the transceiver circuit 32, and then output from the speaker 54 via the bus 34 and the sound processing circuit 50. On the other hand, an audio signal or speech signal of the user is input from a microphone 52, fetched into the controller 36 via the sound processing circuit 50 and the bus 34, and then transmitted from the antenna 30 via the bus 34 and the transceiver circuit 32.

In addition, the user can input a telephone number of a desired communicating partner using the operation panel 44. When the user inputs the telephone number, the controller 36 controls a driver 38 in response thereto, and displays the telephone number on a display 40. Subsequently, if the user instructs a calling using the operation panel 44, the controller 36 carries out a calling side process. Then, when a connection state is established, the controller 36 carries out an above-described telephone communication process.

The mobile telephone 12 also includes a timer 42, and the controller 36 controls the driver 38 based on time information output by the timer 42 so as to display on the display 40 a calendar (month and date), time, and so on.

Furthermore, the mobile telephone 12 includes a reproduction circuit 46 and an interface 56, and the reproduction circuit 46 and the interface 56 are connected to the controller 36 via the bus 34. A terminal 60 is connected to the reproduction circuit 46, and a headphone 24 is connected to the terminal 60 as shown in FIG. 1. In addition, the interface 56 is connected to a memory card 58 attachable to and detachable from a telephone main body. Therefore, if the user instructs a reproduction using the operation panel 44, the controller 36 carries out a reproduction process in response thereto. That is, music data stored in the memory card 58 is read out, and the reproduction circuit 46 reproduces this data to be output to the headphone 24 via the terminal 60.

Figure 3:
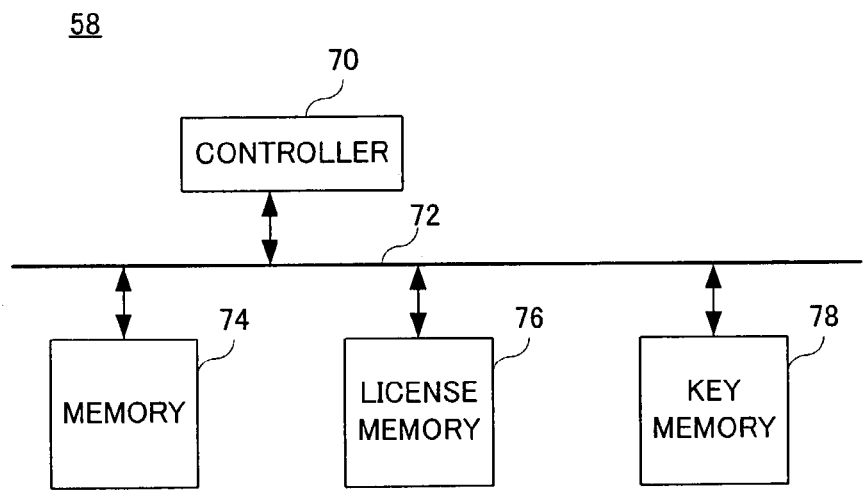
FIG. 3 is an illustrative view showing structure of a memory card shown in FIG. 2.

As shown in FIG. 3, the memory card 58 includes a controller 70, and the controller 70 is connected to a memory 74, a license memory 76, and a key memory 78 via a bus 72. The memory 74 stores data which encrypts data (content data) protected by a copyright such as music data or the like and data which is freely accessed. In addition, the license memory 76 stores data necessary for protecting the copyright such as a content decryption key or the like, that is, license data necessary for reproducing the encrypted content data. Furthermore, the key memory 78 in advance stores a key necessary for a mutual authentication (encryption) process carried out in transmitting and receiving the license data.

Figure 4:
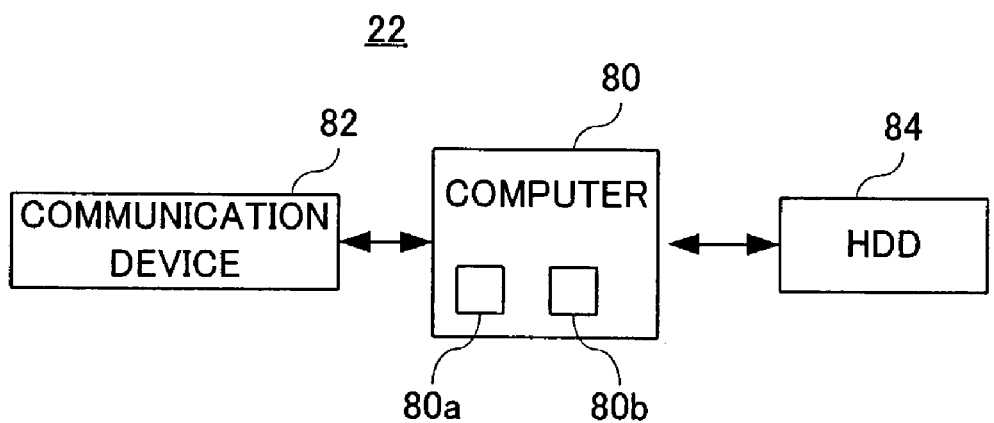
FIG. 4 is an illustrative view showing structure of a menu server shown in FIG. 1 embodiment.

Referring to FIG. 4, the menu server 22 includes a computer 80 such as a personal computer, a workstation and so on, and the computer 80 is connected to a communication device 82 and a HDD (hard disk drive) 84. The communication device 82 can establish a communication with the mobile telephone 12 via the access point MAP, the mobile telephone network 16, and the radio base station 14 in accordance with an instruction of a CPU 80a provided on the computer 80. Furthermore, menu data for displaying in a tabulated fashion a plurality of title names and artist names of music data and a plurality of information (download information) necessary for downloading which respectively respond to a plurality of content data (music data, in this embodiment) are stored in the HDD 84. In addition, information related with a location of access points DAP(1)–DAP(n) to the download server 24 and connection information DAP-TEL(1)–DAP-TEL(n) for connecting to the download server 24 via the access points DAP(1)–DAP(n) are included in the download information.

The menu data and the download information are read out from the HDD 84 in accordance with an instruction of the CPU 80a, and transmitted to the mobile telephone 12 via the communication device 82. That is, the mobile telephone 12 is connected to the Internet 20 via the communication base station 14 and the mobile telephone network 16, and accesses the menu server 22 via this Internet 20. Therefore, a list of the music data, that is, the download information which corresponds to the menu data and the desired music data is obtainable (downloadable).

Figure 5:
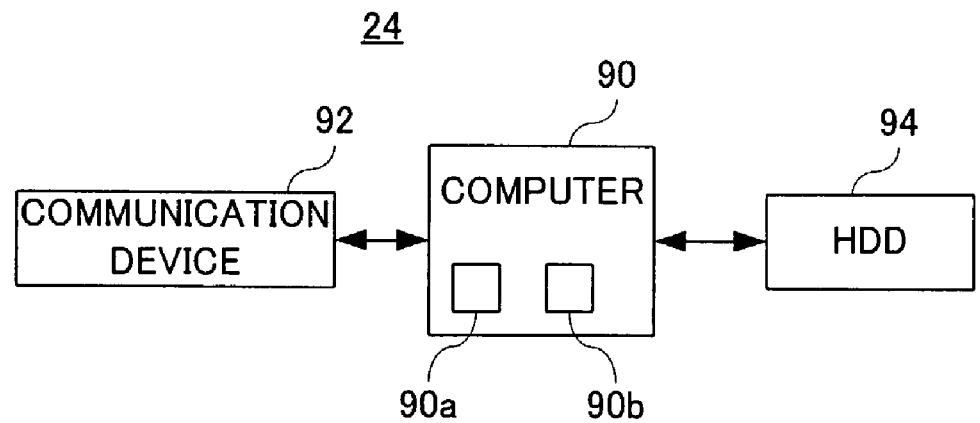
FIG. 5 is an illustrative view showing structure of a download server shown in FIG. 1 embodiment.
Figure 6:
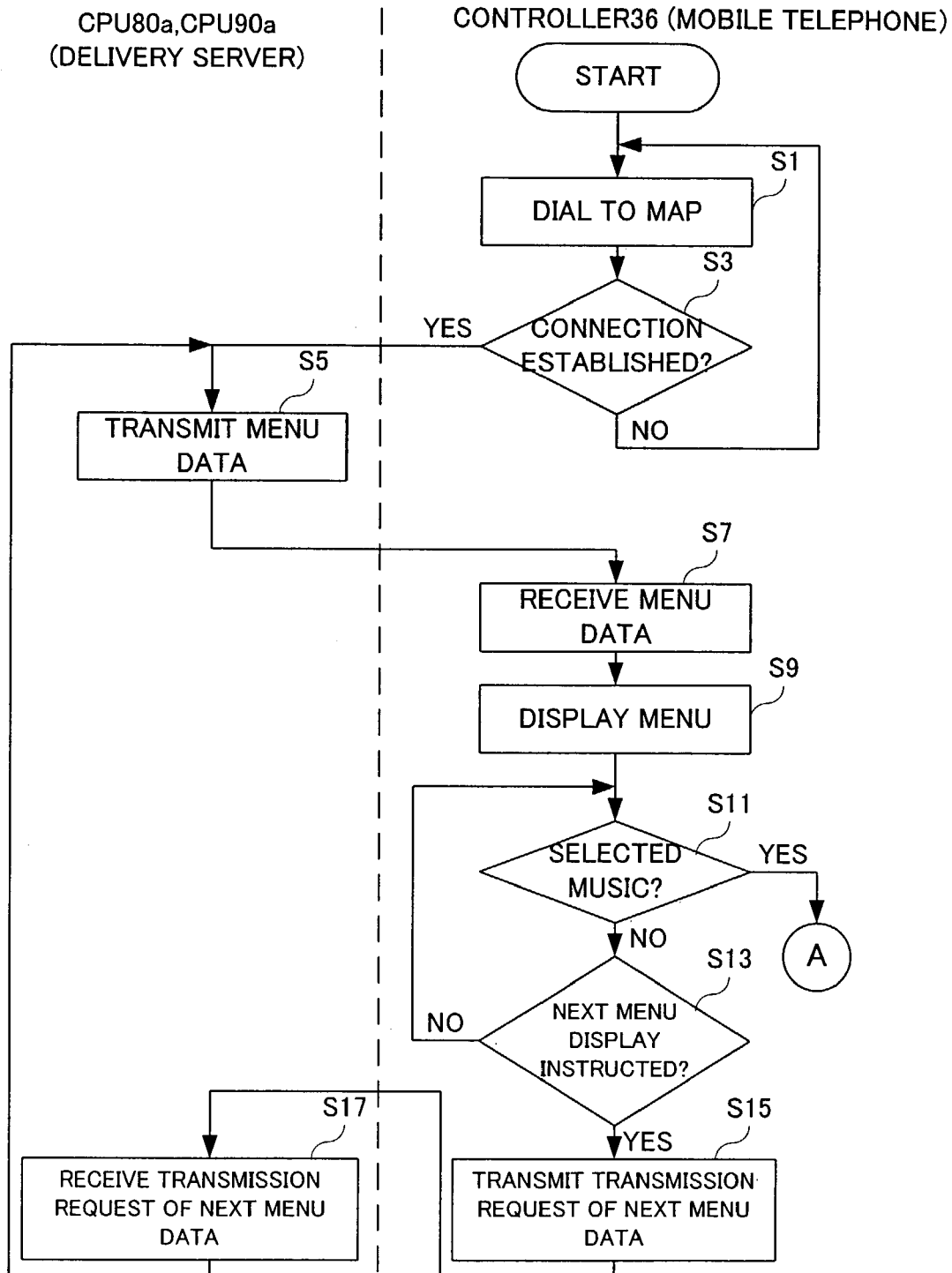
FIG. 6 is a flowchart showing one portion of processes of a controller 36, a controller 70, a CPU 80a, and a CPU 90a in a case of downloading content data within a memory card by the mobile telephone of FIG. 1 embodiment.

Furthermore, referring to FIG. 5, the download server 24 has same structure as the above-described menu server 22, and includes a computer 90. The computer 90 is connected to a communication device 92 and a HDD (hard disk drive) 94. The communication device 92 can establish a connection with the mobile telephone 12 via the Internet 20, the access point DAP(p), the mobile telephone network 16, and the radio base station 14 according to an instruction of a CPU 90a provided on the computer 90. It is noted that $1 \leq p \leq n$ is true, and p is a natural numeral. In addition, a plurality of encrypted music data and license keys each of which correspond thereto are stored in the HDD 94, and desired encrypted music data and license keys each of which correspond thereto are read out according to an instruction of the CPU 90a, which are transmitted to the mobile telephone 12 via the communication device 92. That is, mobile telephone 12 can download the desired encrypted music data and the license keys corresponding thereto by accessing the download server 24.

If the user inputs an instruction for downloading the music data using the operation panel 44, that is, if the user inputs connection information MAP-TEL to the access point MAP for accessing the menu server 22 and carries out the calling operation, for example, a connection is established between the mobile telephone 12 and the menu server 22. It is noted that the connection information MAP-TEL to the access point MAP for accessing the menu server 22 is, in general, a telephone number, a URL or the like.

Therefore, the menu data is transmitted from the menu server 22 to the mobile telephone 12. This menu data is a tabulated list on which the music data can be searched by singer's names or by titles such as a music list book used for selecting a karaoke song.

It is noted that in such the menu data, its volume is so huge that the menu data is transmitted predetermined amount by predetermined amount on the user's instruction, and a menu is sequentially displayed on the display 40 in this embodiment.

If the user selects the desired music data from the menu using the operation panel 44, its selection result is transmitted to the menu server 22. In response thereto, the menu server 22 transmits the download information of the selected music data to the mobile telephone 12. Therefore, the mobile telephone 12 can download the desired music data in accordance with the download information.

In a case of downloading the music data, the access point DAP(p) is connected in accordance with the connection information DAP-TEL(p) to the access point DAP(p)

included in the download information so as to access the download server 24 via this access point DAP(p). However, if a traffic is congested, it takes time to download the music data, and therefore, a communication charge (telephone charge) becomes costly. In order to avert this, the menu server 24 selects the access point DAP(p) where a traffic is not congested out of the access points DAP(1)–DAP(n) for accessing the download server 24, and transmits to the mobile telephone 12 the communication information DAP-TEL(p) to the selected access point DAP(p) included in the download information.

Specific download processes are described in flowcharts shown in FIG. 6–FIG. 11. It is noted that in downloading such the music data protected by the copyright, it is necessary to pay a copyright fee to a proprietor of the copyright. In addition, also it is problematic if the downloaded music data is freely traded, resulting in a lack of protecting the copyright. To avert such the problem or the like, a music data download process is described based on a process disclosed in detail in prior-applied Japanese Patent Application No. 11-345229 by the inventor et al.

Furthermore, the memory card 58 and the delivery server 18 are communicated with each other via the mobile telephone 12 so that the related download process is carried out. Therefore, partitions are provided by a dotted line so that respective processes of the controller 36, the controller 70, and the CPU 80a (or CPU 90a) are understood easily in the Figures.

When the download process is started in accordance with a user's instruction, firstly, the controller 36 dials to the access point MAP of the menu server 22 in a step S1. In a succeeding step S3, the controller 36 determines whether or not a connection is established. If "NO" is determined in the step S3, that is, if the connection is not established, the process returns to the step S1 in order to dial again. On the other hand, if "YES" is determined in the step S3, that is, if the connection is established, the CPU 80a transmits menu data of a predetermined amount in a step S5.

Therefore, the controller 36 receives menu data in a step S7, controls the driver 38 in a step S9 so as to display a menu on the display 40. That is, a tabulated list sectioned by singer's names or by titles in a hiragana (Japanese syllabary characters) alphabetical order is shown on the display 40. Subsequently, the controller 36 determines whether or not there is a music selected in a step S11. That is, it is determined whether or not a determination button (not shown) provided on the panel 44 is depressed. If "YES" is determined in the step S11, that is, if the determination button is depressed, the process proceeds to a step S19 shown in FIG. 7.

On the other hand, if "NO" is determined in the step S11, that is, if the determination button is not depressed, the controller 36 determines whether or not a succeeding menu display is instructed in a step S13. That is, it is determined whether or not a following page button (not shown) provided on the operation panel 44 is depressed. If "NO" is determined in the step S13, that is, if the following page button is not depressed, the process directly returns to the step S11. On the other hand, if "YES" is determined in the step S13, that is, if the following page button is depressed, a transmission request of next menu data is transmitted in a step S15. Therefore, the CPU 80a receives the transmission request of the menu data in a step S17, and the process executes a transmission of next menu data in response thereto.

Figure 7:
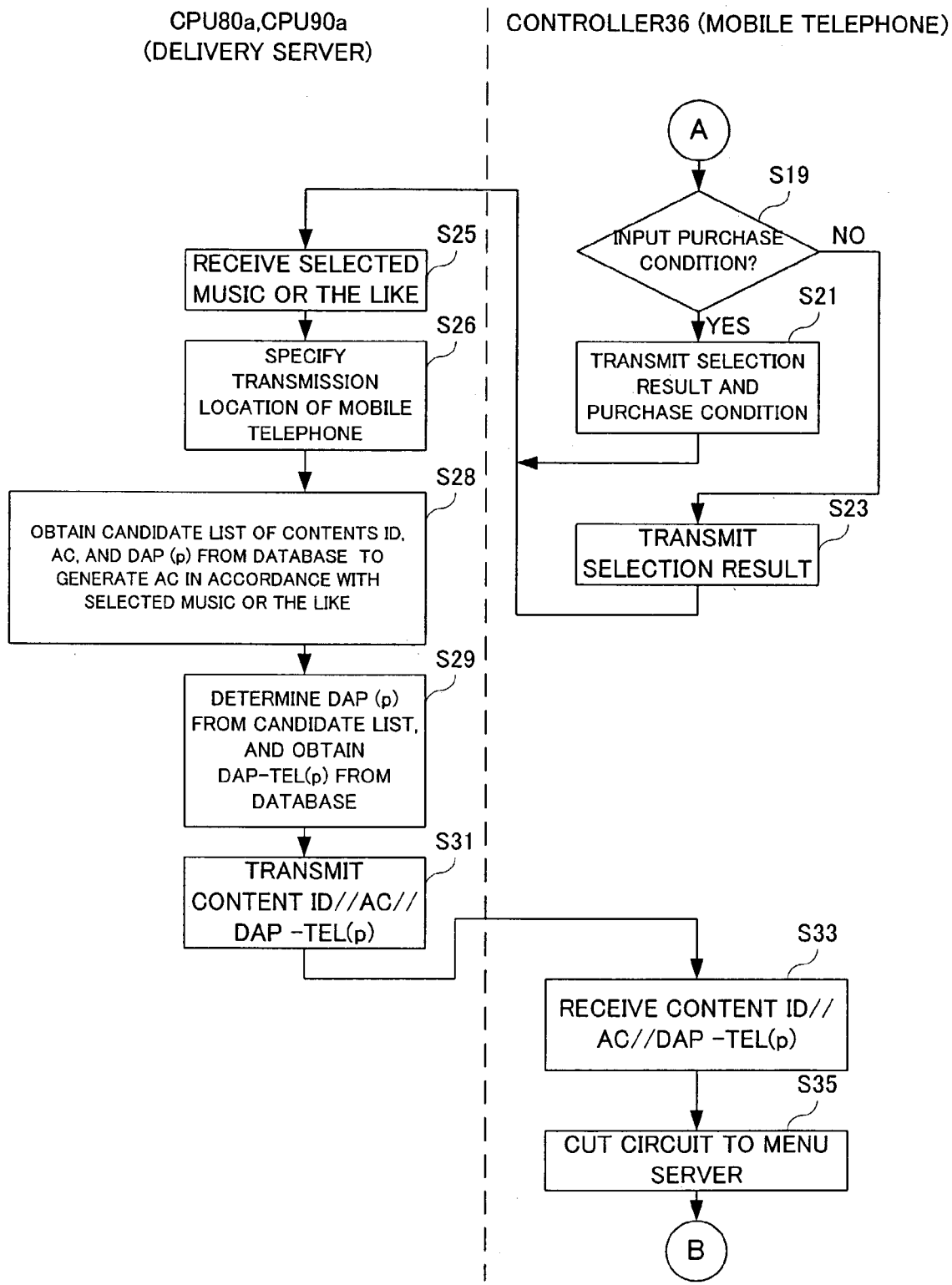
FIG. 7 is a flowchart showing another portion of the processes of the controller 36, the controller 70, the CPU 80a, and the CPU 90a in a case of downloading the content data within the memory card by the mobile telephone of FIG. 1 embodiment.

In a step S19 shown in FIG. 7, the controller 36 determines whether or not a purchase condition is input. That is, it is determined whether or not a reproduction condition (the number of reproductions or the like) is input. If "YES" is determined in the step S19, that is, if the reproduction condition is input, the controller 36 transmits a music selection result and the purchase condition in a step S21. On the other hand, if "NO" is determined in the step S19, that is, if the reproduction condition is not input, the controller 36 transmits only the music selection result in a step S23.

Therefore, the CPU 80a receives the music selection result and so on (both the music selection result and the purchase condition or the selection result only), and stores the same in a RAM 80b. In a succeeding step S26, the CPU 80a specifies (detects) a calling location of the mobile telephone 12. It is noted that the calling location of the mobile telephone 12 can easily be known by a mobile telephone company from a location of the radio base station 14 to which the mobile telephone 12 is connected, and the calling location of the mobile telephone 12 can be specified (detected) by the CPU 80a by transmitting the information being put on a carrier.

Subsequently, the CPU 80a obtains a content ID showing the music data selected in accordance with the music selection result or the like in the step S28 and a candidate list of access points in accordance with the calling location of the mobile telephone 12 from the HDD 84, and generates a license request information AC which encrypts the received purchase condition. The candidate list is in advance determined in accordance with the calling location, and an access point having a relatively short distance (telephone communication distance) between the calling location and the download server is selected to be stored in the HDD 84. In a case that the calling location (calling place) is Osaka, the candidate list of the access points of Osaka, Kyoto, Nara, Shiga, and Hyogo is stored in the HDD 84 in accordance with the calling location, for example, and this candidate list is read out. Thus, since the candidate list in accordance with the calling location is in advance stored, it is possible to prevent to lengthen the telephone communication distance (communicating distance) more than necessary. That is, it is possible to restrain the communication charge (telephone charge).

Next, the CPU 80a determines one access point DAP(p) where a traffic is not congested from the candidate list obtained in the step S29. At this time, the menu server 22 communicates with the download server 24 so as to know an access condition to the download server 24. Therefore, it is possible to determine the access point DAP(P) where a traffic is not congested.

Then, the CPU 80a obtains connection information DAP-TEL(p) to the access point DAP(p) from the HDD 84 in a step S29. Subsequently, the content ID, the license request information AC, and the connection information DAP-TEL (p) are transmitted in a step S31. That is, content ID//AC//DAP-TEL(P) is transmitted.

It is noted that X//Y means to transmit or receive X and Y. The same is hereinafter true in this embodiment.

In a succeeding step S33, the controller 36 receives the content ID//AC//DAP-TEL(P) and stores the same in the RAM 62, and then, cuts-off a circuit to the menu server 22 in a step S35.

Figure 8:
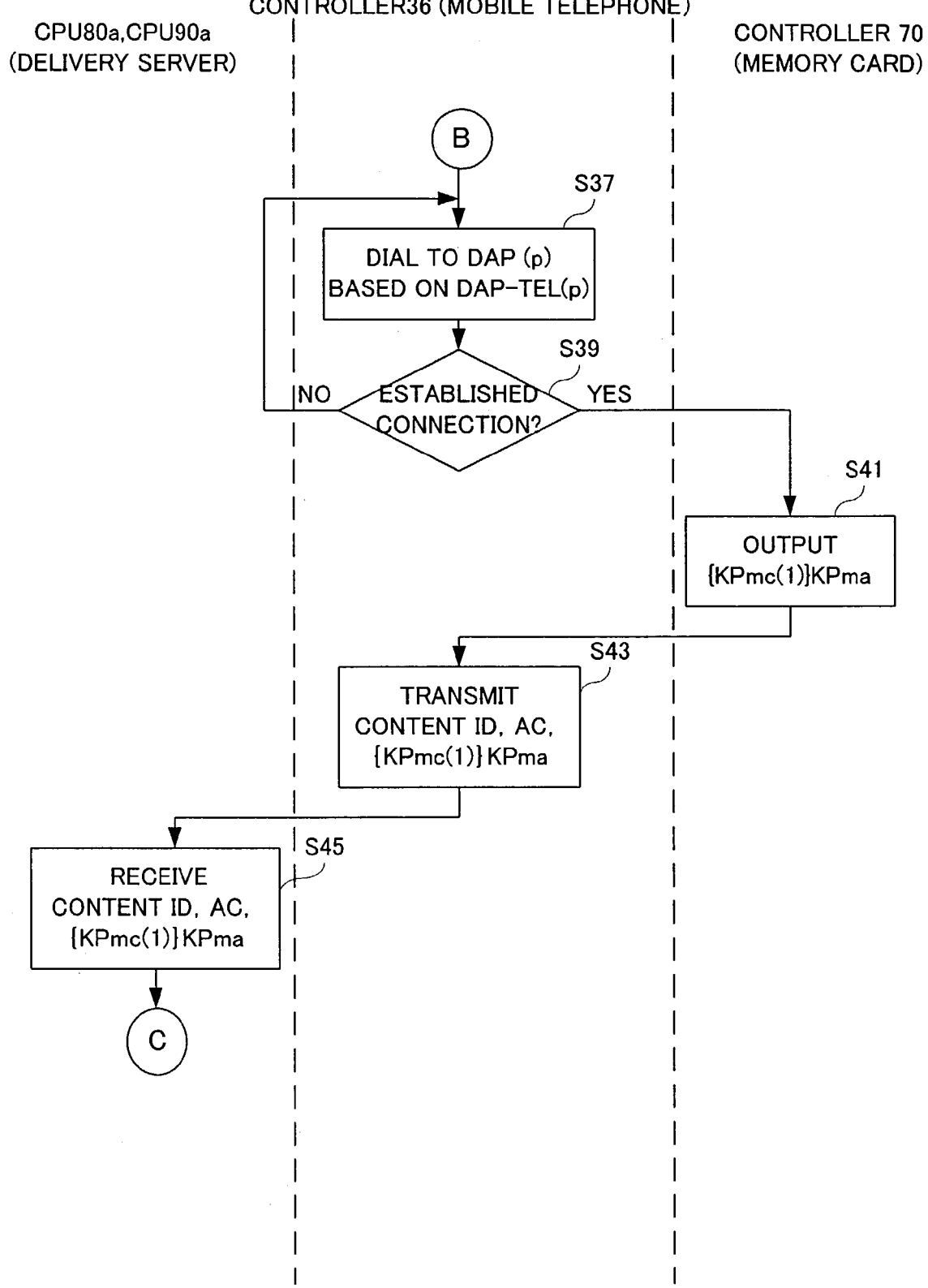
FIG. 8 is a flowchart showing still another portion of the processes of the controller 36, the controller 70, the CPU 80a, and the CPU 90a in a case of downloading the content data within the memory card by the mobile telephone of FIG. 1 embodiment.

Next, the controller 36 gives a telephone call to the download server 24 of a download destination in a step S37 shown in FIG. 8. That is, the controller 36 dials to the access point DAP(p) in accordance with the received connection information DAP-TEL(p). Subsequently, the controller 36 determines whether or not the connection is established in a step S39. If "NO" is determined in the step S39, that is, if no connection is established, the process directly returns to the step S37 so as to re-dial. On the other hand, if "YES" is determined in the step S39, that is, if the connection is established, the controller 70 outputs a certified public encryption key ({KPmc(1)}KPma) in a step S41. It is noted that the certified public encryption key ({KPmc(1)}KPma) is stored in the key memory 78 to which the user or the like cannot directly access. In addition, the certified public encryption key ({KPmc(1)}KPma) is a public encryption key peculiar to a class (a type, a production lot, or the like) of the memory card.

In a succeeding step S43, the controller 36 transmits the content ID, the license request information AC, and the certified public encryption key ({KPmc(1)}KPma). Herein, the content ID is a code for recognizing the music data (content data), and uniquely determined from the title name and the artist's name. In addition, a reproduction condition of the music data is determined from the license request information AC.

Figure 9:
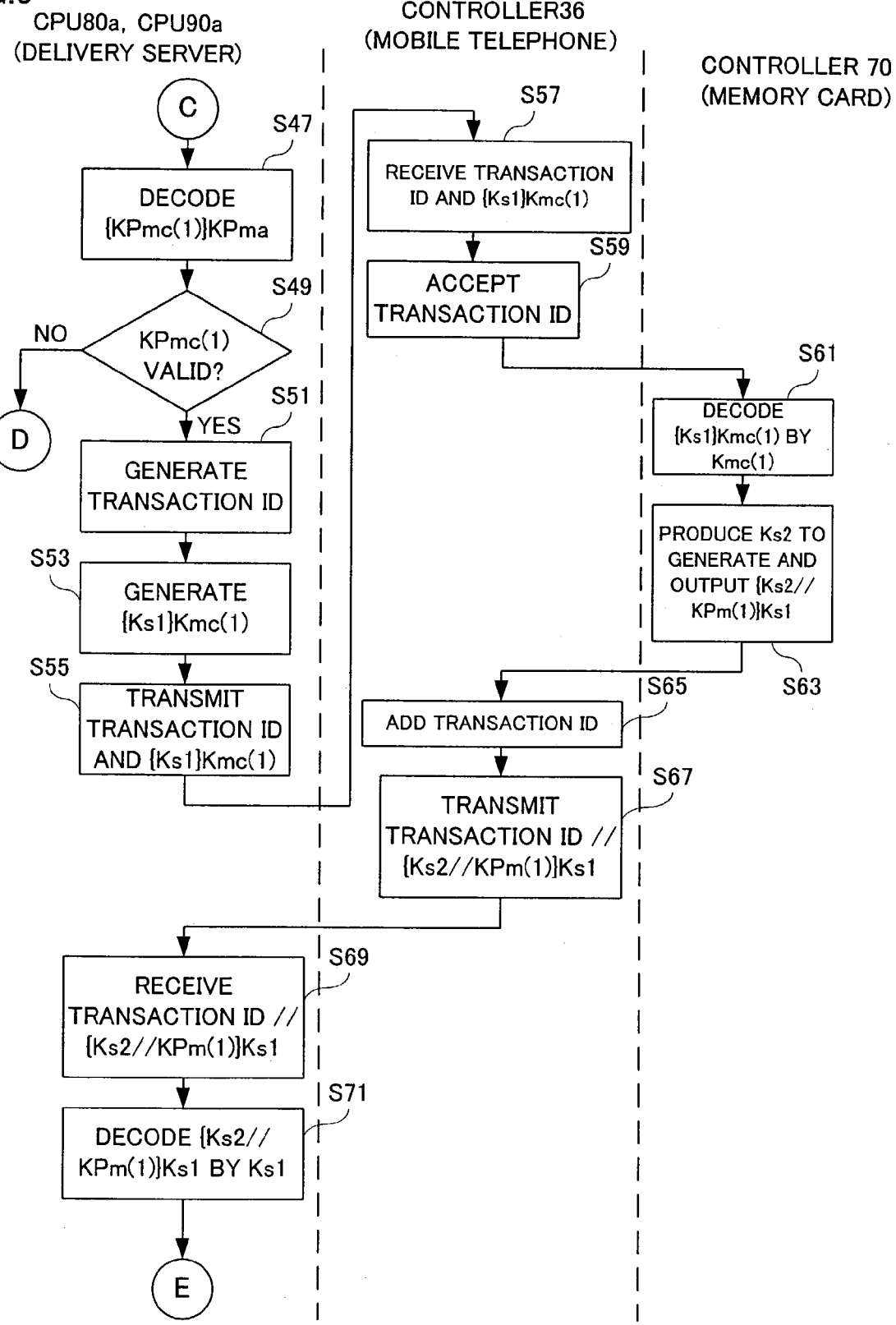
FIG. 9 is a flowchart showing yet still another portion of the processes of the controller 36, the controller 70, the CPU 80a, and the CPU 90a in a case of downloading the content data within the memory card by the mobile telephone of FIG. 1 embodiment.
Figure 10:
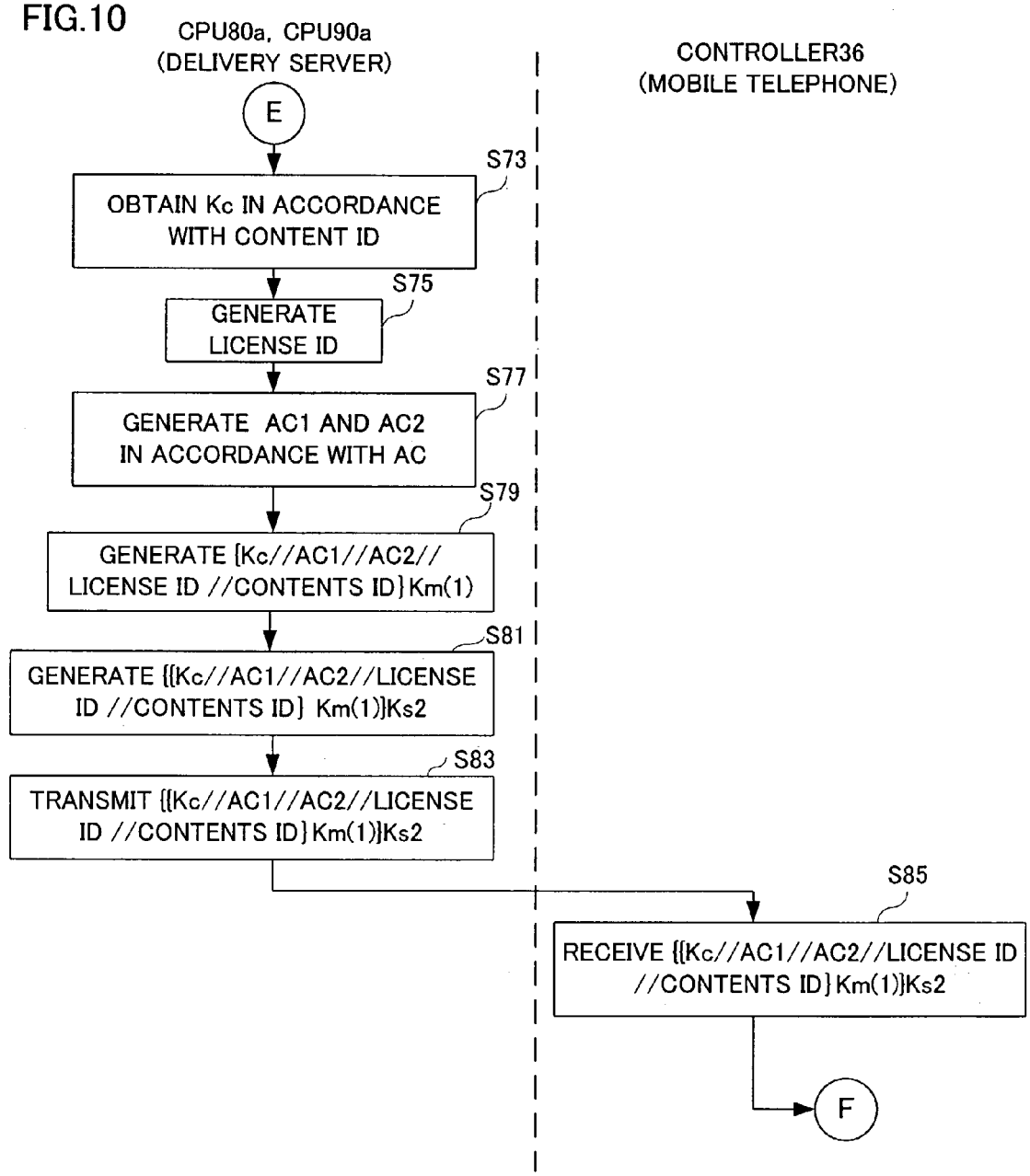
FIG. 10 is a flowchart showing another portion of the processes of the controller 36, the controller 70, the CPU 80a, and the CPU 90a in a case of downloading the content data within the memory card by the mobile telephone of FIG. 1 embodiment.

In a succeeding step S45, the CPU 90a receives the content ID, the license request information AC, and the certified public encryption key ({KPmc(1)}KPma), and decrypts the certified public encryption key ({KPmc(1)}KPma) using the RAM 90b as a work memory in a step S47 shown in FIG. 9.

It is noted that the download server 24 holds within the computer 90 a public key (authentication key: KPma) for decrypting the certified public encryption key ({KPmc(1)}KPma), and decrypts the certified public encryption key ({KPmc(1)}KPma) using this authentication key (KPma). In addition, {X}Y means information that X is encrypted to be decrypted by the key Y. The same is hereinafter true in this embodiment.

In a step S49, the CPU 90a determines whether or not the authentication key (KPma) included in the certified public encryption key ({KPmc(1)}KPma) received as a result of the decrypting is valid. At this time, the CPU 90a investigates whether or not the public encryption key (KPmc(1)) is valid by inquiring of the authentication server 26 based on a certification obtained in the step S47.

Figure 11:
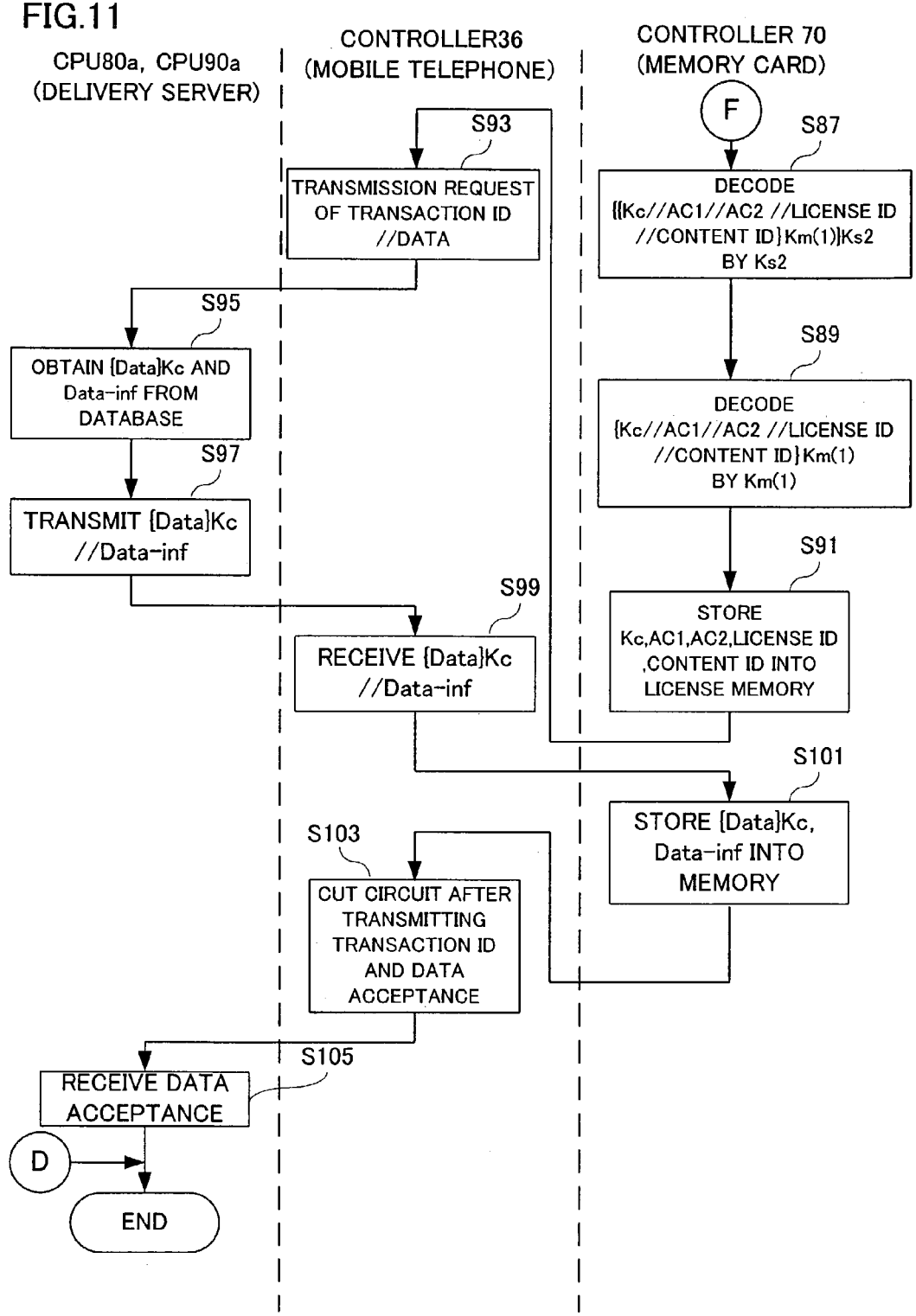
FIG. 11 is a flowchart showing still another portion of the processes of the controller 36, the controller 70, the CPU 80a, and the CPU 90a in a case of downloading the content data within the memory card by the mobile telephone of FIG. 1 embodiment.

If "NO" is determined in the step S49, that is, if the public encryption key (KPmc(1)) is invalid, the process is directly ended as shown in FIG. 11. On the other hand, if "YES" is determined in the step S49, that is, the public encryption key (KPmc(1)) is valid, the CPU 90a produces a code (transaction ID) capable of specifying a delivery session using the RAM 90b. Subsequently, the CPU 90a generates a symmetric key (Ks1) peculiar to the session using the RAM 90b in a step S51, and applies an encryption to be decrypted by a private decryption key (Kmc(1)), which is asymmetric and peculiar to a media class of a memory card 58 using the public encryption key (KPmc(1)) in a step S53. That is, {Ks1}Kmc(1) is outputted. Then, the CPU 90a transmits the transaction ID previously produced and the {Ks1}Kmc(1) in a step S55.

In a succeeding step S57, the controller 36 receives the transaction ID and the {Ks1}Kmc(1), and accepts the transaction ID only in a step S59, which is temporarily stored in the RAM 62. It is noted that the {Ks1}Kmc(1) is directly transmitted to the controller 70 within the memory card 58. Therefore, upon receipt of the {Ks1}Kmc(1), the controller 70 decrypts the {Ks1}Kmc(1) by the private decryption key (Kmc(1)) peculiar to the class of the memory card 58, and accepts the symmetric key (Ks1) peculiar to the session in a step S61. It is noted that the private decryption key (Kmc(1)) peculiar to the class of the memory card 58 is in advance stored in the key memory 78 within the memory card 58 similar to the certified public encryption key ({KPmc(1)}KPma).

Next, the controller 70 generates a symmetric key (Ks2) peculiar to the session in a step S63, and encrypts the symmetric key (Ks2) peculiar to the session and the public encryption key (KPmc(1)) by the symmetric key (Ks1), which are then output. That is, {Ks2//KPm(1)}Ks1 is generated, and applied to the controller 36 via the bus 34. The public encryption key (KPmc(1)) is also in advance stored in the key memory 78 within the memory card 58.

It is noted that {X//Y}Z means information that X and Y are encrypted to be decrypted by the key Z, respectively. The same is hereinafter also true in this embodiment.

Then, the controller 36 adds the transaction ID to the {Ks2//KPm(1)}Ks1 in a step S65, and transmits a {Ks2//KPm(1)}Ks1//transaction ID in a step S67.

In the CPU 90a, the {Ks2//KPm(1)}Ks1//transaction ID is received in a step S69, and the {Ks2//KPm(1)}Ks1//transaction ID is decrypted by the symmetric key (Ks1) peculiar to the session using the RAM 90b in a step S71. Therefore, Ks2 and KPm(1) are obtained. Subsequently, the CPU 90a obtains the content decryption key (Ks) from a database stored in the HDD 94 in accordance with the content ID previously obtained (in the step S45) in a step S73 shown in FIG. 10. Next, the CPU 90a produces an administration code (license ID) capable of specifying the issue of the license in a step S75.

In addition, the CPU 90a produces limit information (AC1) and control information (AC2) in the reproduction circuit 46 in accordance with the license request information AC obtained in advance (in the step S45), and the CPU 90a encrypts the content decryption key (Kc), the limit information (AC1), the control information (AC2), the license ID, and the content ID by the public encryption key (KPmc(1)), which is decryptable by the decryption key (Km(1)) peculiar to the memory card 58 in a step S79. That is, {Kc//AC1//AC2//license ID//content ID}Km(1) is outputted.

It is noted that in this embodiment, the limit information (AC1) includes permission information showing whether or not to permit a reading of the content decryption key (Kc) and number of times limit information which limits the number of reproductions. The number of times limit information is two-bit data, for example, and set between "00"–"FF". The number of times limit information being "00" means not possible to reproduce, and in a case of "FF", it means no limit regarding the number of reproduction times. Furthermore, the number of reproduction times is limited between "01"–"FE". In addition, the control information (AC2) is information including a reproduction period such as a data and time to be reproduced, and so on.

Subsequently, the CPU 90a encrypts the {Kc//AC1//AC2//license ID//content ID}Km(1) by the symmetric key (Ks2) peculiar to the session using the RAM 90b in a step S81. That is, {{Kc//AC1//AC2//license ID//content ID}Km(1)}Ks2 is outputted. Then, the {{Kc//AC1//AC2//license ID//content ID}Km(1)}Ks2 is transmitted in a step S83.

Therefore, the controller 36 receives the {{Kc//AC1//AC2//license ID//content ID}Km(1)}Ks2 in a step S85, which is later applied to the controller 70 in the memory card 58. In response thereto, the controller 70 decrypts the {{Kc//AC1//AC2//license ID//content ID}Km(1)}Ks2 by the symmetric key (Ks2) in a step S87 shown in FIG. 11. Therefore, {Kc//AC1//AC2//license ID//content ID}Km(1) is outputted. Subsequently, the controller 70 decrypts the {Kc//AC1//AC2//license ID//content ID}Km(1) by the decryption key (Km(1)) peculiar to the memory card 58 stored in the key memory 78, which is transformed into a plain text in a step S89. Therefore, the content decryption key (Kc), the limit information (AC1), the control information (AC2), the license ID, and the content ID are obtained. Subsequently, the controller 70 stores the content decryption key (Kc), the limit information (AC1), the control information (AC2), the license ID, and the content ID into the license memory 76 via the bus 72 in a step S91.

When the content decryption key (Kc), the limit information (AC1), the control information (AC2), the license ID, and the content ID are stored into the license memory 76, the controller 36 transmits the transaction ID and the data transmission request obtained in advance (in the step S59) in a step S93. In response thereto, the CPU 90a obtains from the HDD 94 the music data, that is, {Data}Kc which encrypted the content data (Data) to be decryptable by the content decryption key (Kc) and additional information (Data-inf) of the content data (Data). It is noted that the additional information (Data-inf) includes plain text information such as corresponding content data in association with its work, or in association with the server access, the title name, lyrics, an album jacket, and so on. In a succeeding step S97, the CPU 90a transmits {Data}Kc//Data-inf.

Therefore, the controller 36 receives the {Data}Kc//Data-inf in a step S99, which is applied to the controller 70 in the memory card S58 later. The controller 70 accepts the {Data}Kc//Data-inf in a step S101, and stores the encrypted content data {Data}Kc and the additional information (Data-inf) into the memory 74.

Upon completion of storing the encrypted content data {Data}Kc and the additional information (Data-inf), the controller 36 transmits the transaction ID and a data acceptance in a step S103, and cuts-off the line later. Therefore, the CPU 90a receives the transaction ID and the data acceptance in a step S105, and ends the process.

Thus, the mobile telephone 12 accesses the download server 24 in accordance with the download information obtained from the menu server 22, and can download content data (music data), its additional information and necessary information (license information) for a reproduction such as the encrypted the decryption key. Therefore, the encrypted music data, its additional information, and the license information are stored in the memory card 58.

It is noted that although in this embodiment the encrypted music data and the license information are downloaded from the download server, at least the license information may be downloaded from the download server. That is, the encrypted music data may be obtained from another deliver server, and also be obtained from an appendix of a magazine, such as a CD or the like.

In addition, the downloaded music data can be reproduced using the mobile telephone 12. The music data reproduced in the reproduction circuit 46 is output via the headphone 24 connected to the output terminal 60. It is noted that a reproduction process is also disclosed in detail in prior-filed Japanese Patent Application No. 11-345229 by the inventor et al.

Figure 12:
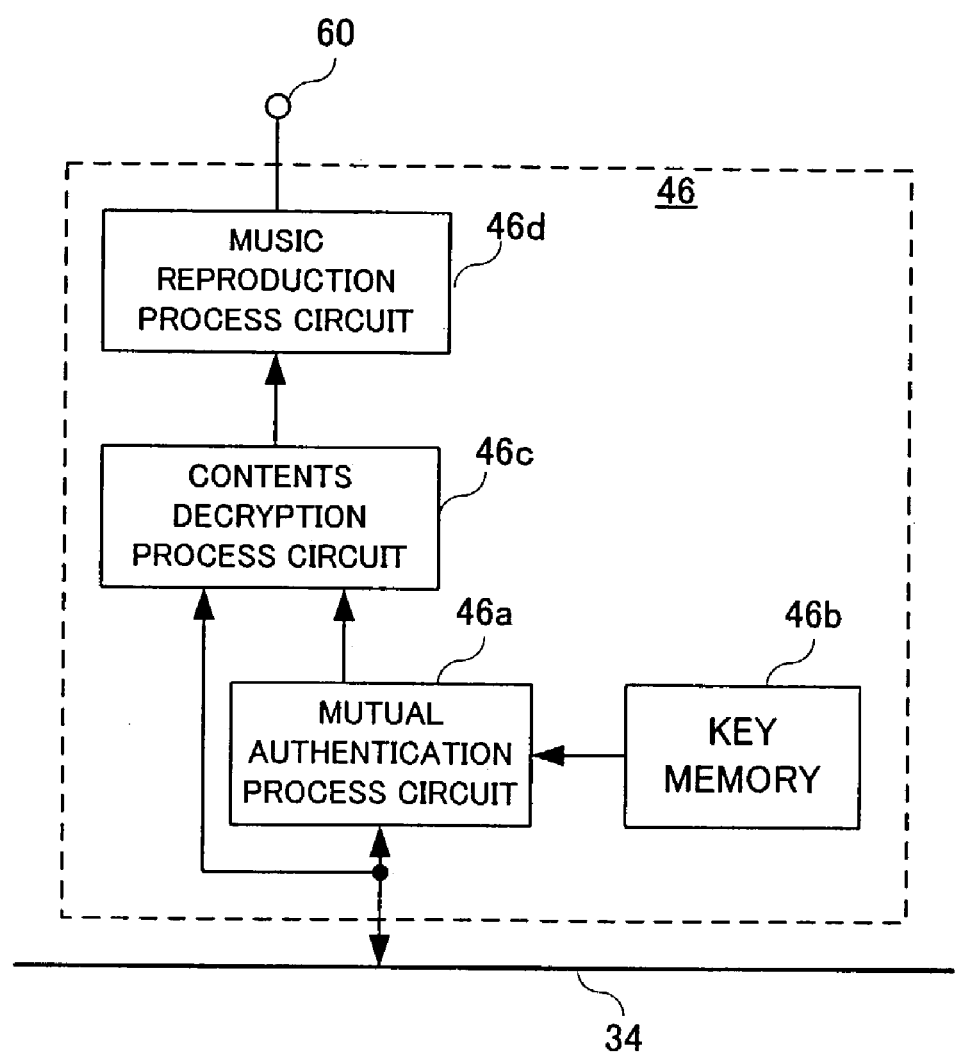
FIG. 12 is an illustrative view showing structure of a reproduction circuit shown in FIG. 2 embodiment.

Referring to FIG. 12, the reproduction circuit 46 includes a mutual authentication process circuit 46a. The mutual authentication process circuit 46a is connected to the memory card 58 via the bus 34, and carries out a mutual authentication by exchanging a key between the memory card 58 in order to obtain the content decryption key (Kc) and the limit information (AC2) protected by a copyright. In addition, a key memory 46b and a content decryption process circuit 46c are connected to the mutual authentication process circuit 46a. The key memory 46b stores a key peculiar to a class of the reproduction circuit 46 handled by the mutual authentication process circuit 46a. In addition, the content decryption process circuit 46c is connected to the memory card 58 via the bus 34, and the encrypted music data ({Data}Kc) is applied from the memory card 58 thereto. Furthermore, the content decryption key (Kc) obtained finally in the mutual authentication process circuit 46a is also applied thereto. Therefore, the music data ({Data}Kc) encrypted using the content decryption key (Kc) is decrypted (decoded into a plain text) in the content decryption process circuit 46c. That is, the music data (Data) is output as plain text information from the content decryption process circuit 46c, and applied to a music reproduction process circuit 46d. The music reproduction process circuit 46d applies a reproduction process to the music data (Data), which is output to the terminal 60.

Figure 13:
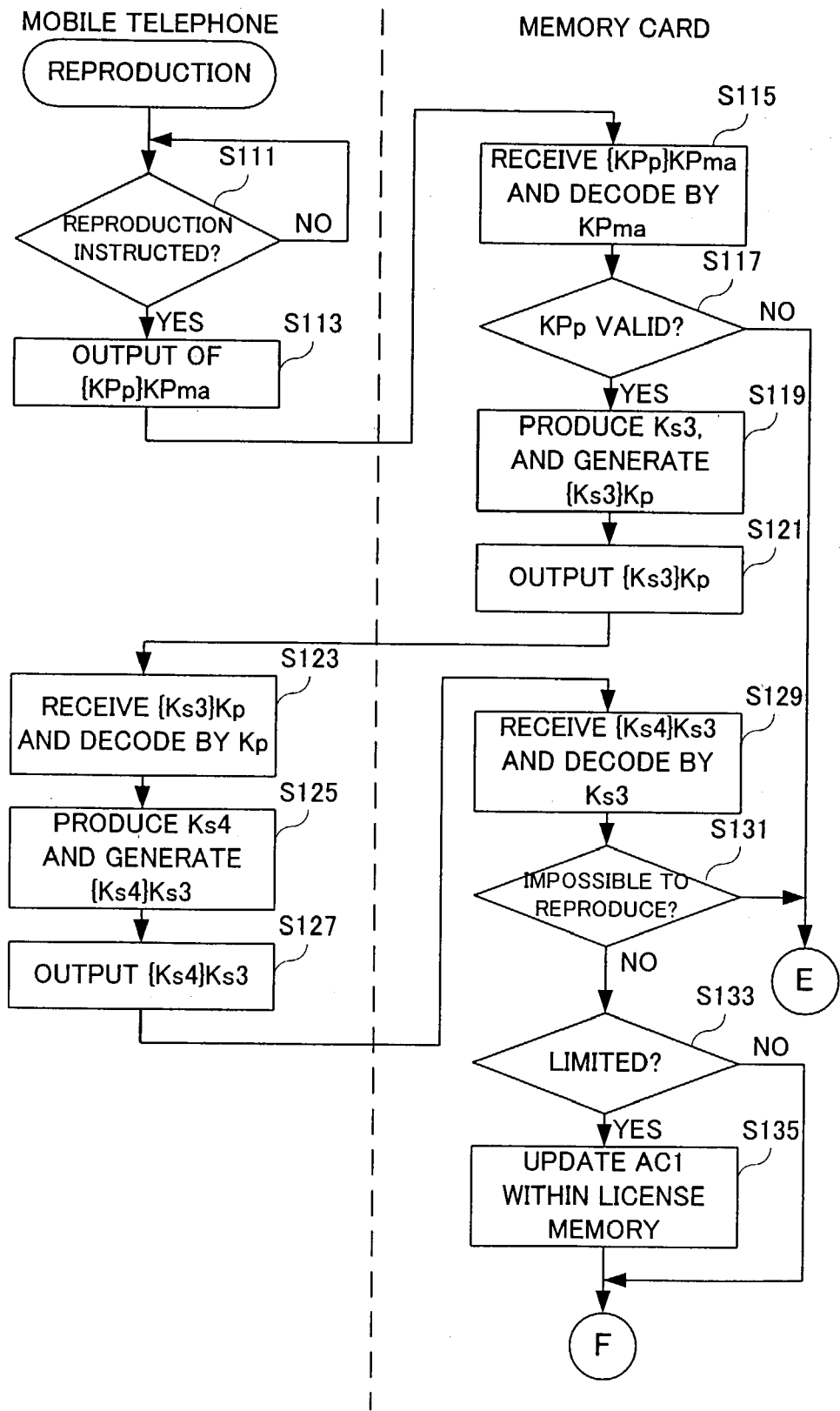
FIG. 13 is a flowchart showing one portion of the reproduction process of content data by the mobile telephone of FIG. 1 embodiment.
Figure 14:
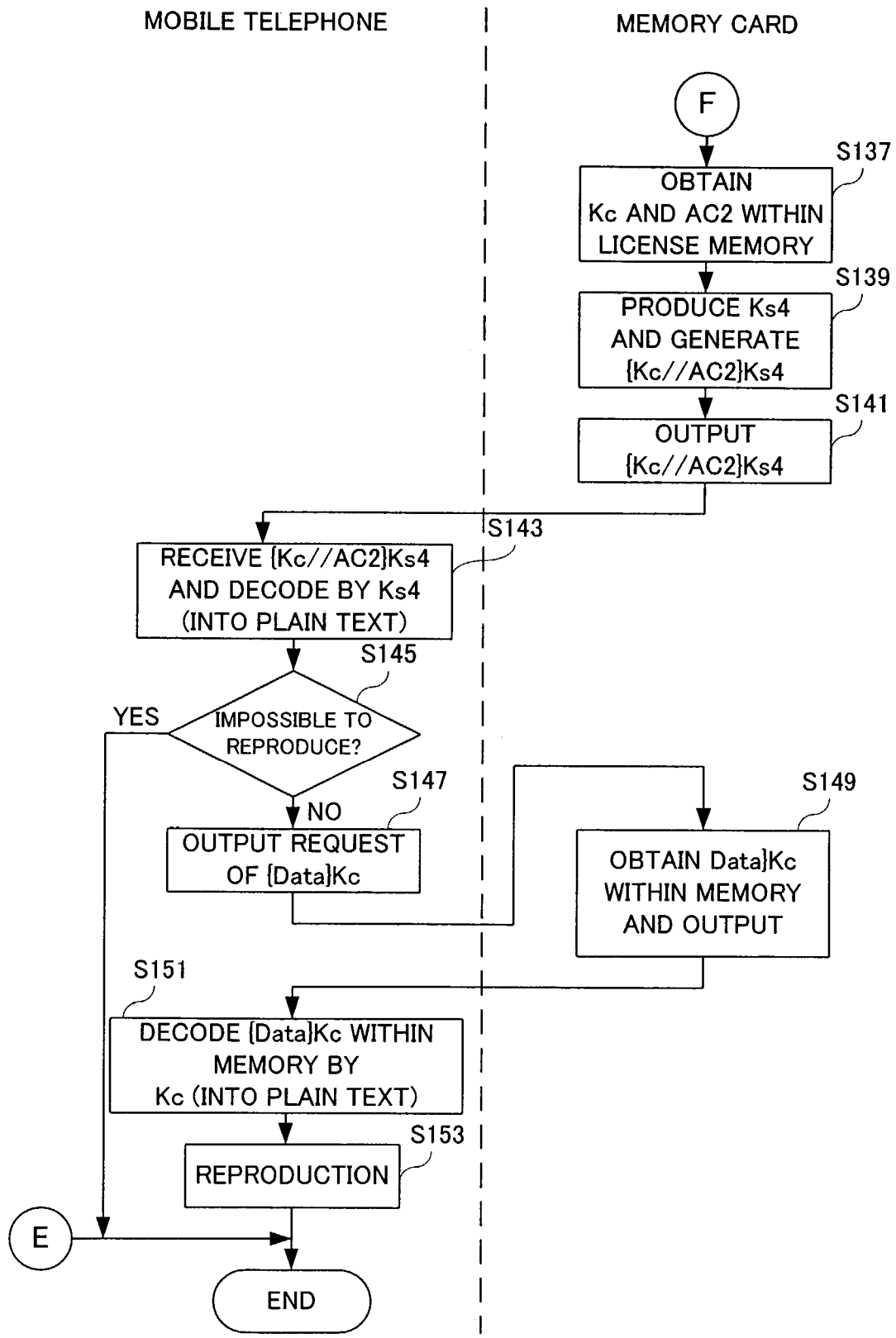
FIG. 14 is a flowchart showing another portion of the reproduction process of the content data by the mobile telephone of FIG. 1 embodiment.

More specifically, the reproduction process is carried out in accordance with a flowchart shown in FIG. 13 and FIG. 14. The reproduction process is carried out by the controller 36 and the reproduction circuit 46 in the mobile telephone 12 and the controller 70 in the memory card 58 as described above. Therefore, sections are provided by a dotted line so that respective operations are easily understood in FIG. 13 and FIG. 14.

Firstly, the controller 36 determines whether or not a reproduction instruction is input by the user in a step S111. If "NO" is determined in the step S111, that is, if the reproduction instruction is not input, the process returns to the same step S111. On the other hand, if "YES" is determined in the step S111, that is, the reproduction instruction is input, the controller reads out the certified public encryption key ({KPmc(1)}KPma) stored in the key memory 46b in a step S113, which is then output.

Therefore, the controller 70 receives the certified public encryption key ({KPmc(1)}KPma), and decrypts the certified public encryption key ({KPmc(1)}KPma) by the authentication key (KPma) in a step S115. In a succeeding step S117, the controller 70 determines whether or not the public encryption key (KPp) peculiar to the class of the reproduction circuit 46 is valid as a result of the decrypting in the step S115. If "NO" is determined in the step S117, that is, if the public encryption key (KPp) is invalid, the process is directly ended as shown in FIG. 14. On the other hand, if "YES" is determined in the step S117, that is, if the public encryption key (KPp) is valid, the controller 70 generates a symmetric key (Ks3) peculiar to the session in a step S119, and encrypts to be decryptable by a private decryption key (Kp) which is asymmetric to the public encryption key (KPp) stored in the key memory 46b and in pair. That is, {Ks3}Kp is outputted. Then, the controller 70 outputs the {Ks3}Kp in a step S121.

Next, the controller 36 receives the {Ks3}Kp in a step S123, which is input into the mutual authentication process circuit 46a. Then, the mutual authentication process circuit 46a decrypts (decrypts into a plain text) the {Ks3}Kp by the private decryption key (Kp) held in the key memory 46b. In a succeeding step S125, a symmetric key (Ks4) peculiar to the session is generated, and the symmetric key (Ks4) is encrypted by the symmetric key (Ks3). That is, {Ks4}Ks3 is outputted. Subsequently, the {Ks4}Ks3 is output to the memory card 58 in a step S127.

Upon receipt of the {Ks4}Ks3, the controller 70 decrypts (decodes into a plain text) by the symmetric key (Ks3) in a step S129. Therefore, the symmetric key (Ks4) is obtained. In a succeeding step S131, the controller 70 determines whether or not reproducible based on the limit information (AC1). If "YES" is determined in the step S131, that is, if a reading of the content decryption key (Kc) is not permitted or although the reading of the content decryption key (Kc) is permitted, the number of times limit information is "00", the process is ended as shown in FIG. 14 assuming that it is not reproducible. On the other hand, if "NO" is determined in the step S131, that is, if the reading of the content decryption key (Kc) is permitted and the number of times limit information is other than "00", it is determined whether or not the number of reproduction times has a limit thereon in a step S133.

If "NO" is determined in the step S133, that is, if the number of times limit information is "FF" and the number of reproduction times is not limited, the process directly proceeds to a step S137 shown in FIG. 14. On the other hand, if "YES" is determined in the step S133, that is, if the number of times limit information is "1"–"FE", the process proceeds to the step S137 after updating (count down) the number of times limit information within the license memory 76 in a step S135.

In the step S137 shown in FIG. 14, the controller 70 obtains the content decryption key (Kc) within the license memory 76 and the limit information (AC2) of the reproduction circuit, and encrypts the content decryption key (Kc) and the limit information (AC2) of the reproduction circuit by the symmetric key (Ks4) peculiar to the session obtained in advance in a succeeding step S139. Therefore, {Kc//AC2}Ks4 is outputted. Next, the controller 70 outputs the {Kc//AC2}Ks4 in a step S141.

Therefore, the controller 36 obtains the {Kc//AC2}Ks4 in a step S143, and inputs into the mutual authentication process circuit 46a. Then, the mutual authentication process circuit 46a decrypts (decrypts into a plain text) the {Kc//AC2}Ks4 by the symmetric key (Ks4) in accordance with an instruction of the controller 36. The content decryption key (Kc) obtained to be decrypted in this manner is applied to the content decryption process circuit 46c, and the limit information (AC2) is applied to the controller 36. Subsequently, the controller 36 determines whether or not reproducible based on the limit information (AC2) in a step S145. That is, it is determined whether or not a period capable of reproducing is elapsed in the reproduction circuit 46 based on time information applied from the timer 42. If "YES" is determined in the step S145, that is, if the period capable of reproducing is elapsed, the process is directly ended. On the other hand, if "NO" is determined in the step S145, that is, if within the period capable of reproducing, the encrypted music data {Data}Kc is requested to output in the step S147. In response thereto, the controller 70 within the memory card 58 obtains the {Data}Kc within the memory 74 in a step S149, which is then output.

In response thereto, the controller 36 inputs the encrypted music data {Data}Kc into a contents decryption process circuit 46c in the step S151. The contents decryption process circuit 46c decrypts (decodes into a plain text) the encrypted music data {Data}Kc by the content decryption key (Kc), and the music data (Data) is applied to the reproduction process circuit 46d within the reproduction circuit 46 in a step S153. Then, the process ends by reproducing the music data (Data).

Thus, the obtained music data is to be reproduced.

According to this embodiment, the mobile telephone obtains an access point where a traffic is not congested, and accesses the download server from that access point so that it is possible to download desired music data by averting the traffic congestion without an unnecessary or additional operation. This allows to prevent a telephone communication time from being prolonged due to the traffic congestion, thus enabling to restrain a telephone charge.

In addition, although one download server is shown to be connected with regard to a plurality of access points DAP (1)–DAP(p), even if there are a plurality of download servers, it is possible to carry out the similar process if the download servers are assigned to be corresponding to the respective access points.

Furthermore, in a case that a plurality of access points and a plurality of download servers are flexibly connected with each other via the Internet, it is still possible to carry out the similar process if, assuming that a combination of the access points and the download servers is one quasi-access point, the connection information to the quasi-access point is rendered a telephone number for connecting to an actual access point and a URL for specifying the download server.

Figure 15:
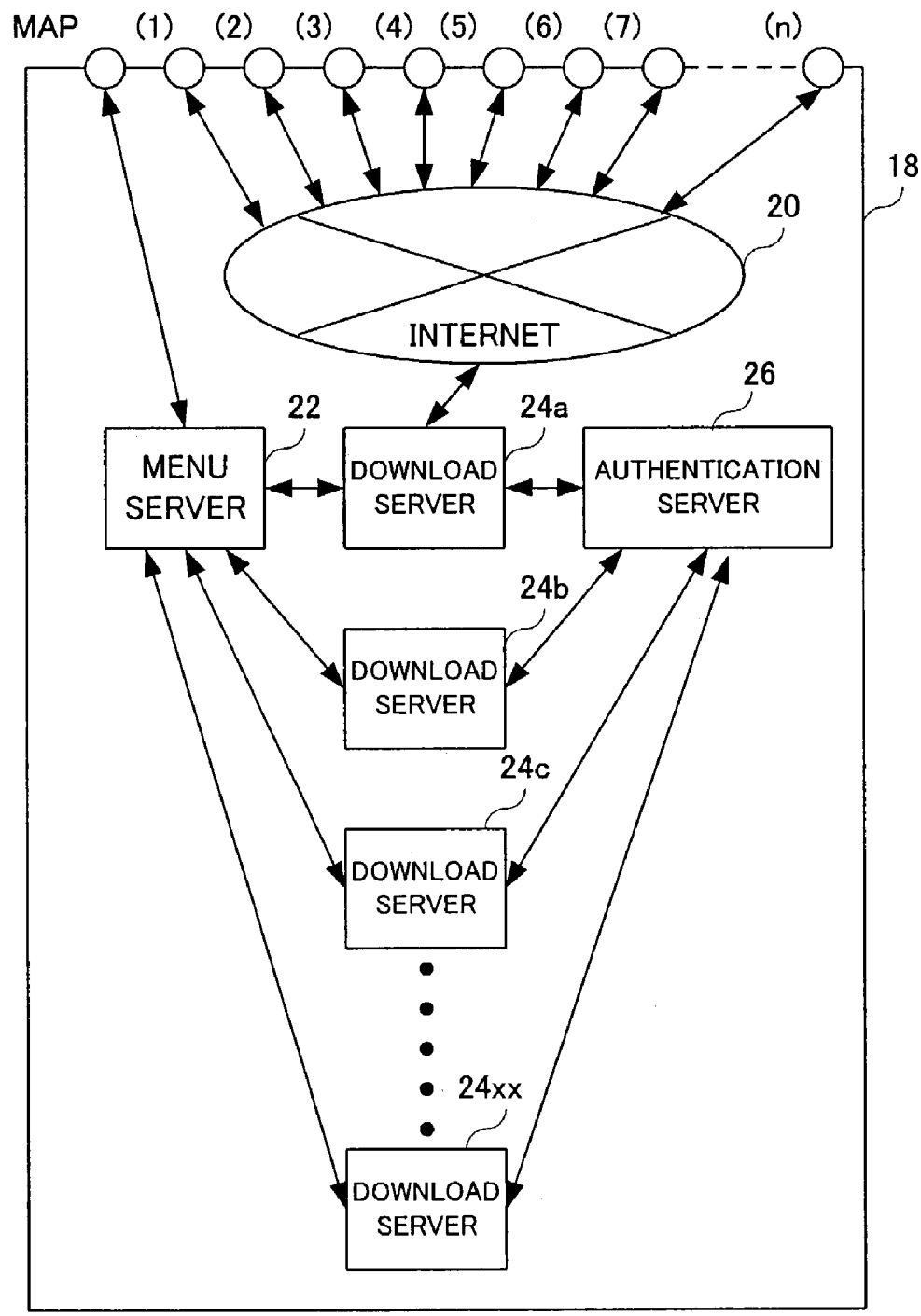
FIG. 15 is an illustrative view showing another embodiment of the present invention.

A download system 10 of another embodiment shown in FIG. 15 is the same as the above-described embodiment except that the delivery server 18 is provided with two or more download servers. Therefore, duplicated descriptions are omitted.

It is noted that for the convenience to illustrate in Figure, the mobile telephone 12, the radio base station 14, and the mobile telephone network 16 are omitted in FIG. 15. In addition, the download server 24a is connected to the Internet 20, and has access points DAP(1)–DAP(p). Although not shown, similar to the download server 24a, other download servers 24b–24xx are connected to the Internet 20, respectively. Furthermore, the other download servers 24b–24xx have at least two access points (not shown), respectively.

In such the download system 10, the download servers 24b–24xx are provided in such a manner as to cover previously determined zones or areas (prefecture, for example), respectively. In addition, all the download servers 24b–24xx are respectively connected to the menu server 22 and the authentication server 26.

Therefore, when the menu server 22, that is, the CPU 80a is accessed by the mobile telephone 12, the mobile telephone 12 detects an installation location of the radio base station 14 in use, that is, specifies a calling location of the mobile telephone 12 so as to select the download server that covers the calling location. If the download server 24a is selected, for example, an access condition of the respective access points DAP(1)–DAP(p) of the selected download server 24a is detected so as to determine the access point DAP(p) where the traffic is not congested. It is noted that the same is also true when the other download servers 24b–24xx are selected.

Since a specific download process is approximately also same as the above-described embodiment, duplicated descriptions are omitted. In this download system 10, since a plurality of download servers 24 are provided as described above, a step S27 that selects one of the download servers 24a–24xx in accordance with the calling location of the mobile telephone 12 is provided between the step S26 and the step S28 shown in FIG. 7. In addition, in the step S28, the content ID showing the music data selected in accordance with a music selection result or the like and a candidate list of access points capable of connecting to the download server selected in the step S27 are obtained from the HDD 84, and also a license request information AC that encrypted the received purchase condition is generated. In the succeeding steps 29, one access point where a traffic is not congested may be determined from the candidate list of the access points obtained from the HDD 84 in the step S28 so as to obtain the connection information from the HDD 84.

According to this embodiment, download servers are respectively provided in different regions or areas, and the download server closer to the calling location of the mobile telephone is selected, thus possible to access an access point with a relatively short distance. In addition, since the access point where a traffic is not congested is selected as in the embodiment in FIG. 1, a required time for downloading is not prolonged more than necessary. That is, a telephone charge will not become costly.

Furthermore, although in the above-described embodiment, it is described that a plurality of download servers cover previously determined regions or areas, it may be possible to cover content data by content data (music data). In this case, one download server may be selected by the music data selected in the step S27 described to be supplemented to FIG. 7.

In addition, the same is still true in a case that a plurality of download servers are provided depending on the content data to be covered and the areas to be covered, respectively.

It is noted that in these embodiments, although only the music data is shown as content data, it is needless to say that content data such as image data or the like protected by a copyright can also be put into application. However, in a case of the image data, the image is shown on a display of the mobile telephone when an instruction of reproduction is input after downloading.

Moreover, in these embodiments, in a case of encrypting and decrypting the data in each of the memory card, the download server, and the menu server, the corresponding controller or the CPU are to carry out a process. However, since it requires a vast amount of processes to encrypt/decrypt, an exclusive circuit may be provided.

Furthermore, although in these embodiments, the music data is downloaded into the memory card via the mobile telephone 12, an exclusive device for reproduction or downloading having no communication function with another mobile telephone may be used.

Still furthermore, although in these embodiments, a case that a one company (data delivery agent) has a business contract with respect to the menu server is described, a plurality of data delivery agents may have the contract. Therefore, in a case that respective data delivery agents have one download server as in the FIG. 1 embodiment, the menu server determines the data delivery agent that holds (sales) the selected music data, and an access point of the download server determined based on a traffic condition and owned by the data delivery agent may be determined.

In addition, in a case that the respective data delivery agents have a plurality of download servers as in the FIG. 15 embodiment, firstly, the menu server determines the data delivery agent that holds (sales) the selected music data. Secondly, a calling location of the mobile telephone is specified so as to select the download server having the shortest telephone communication distance. Then, an access point of the download server selected based on the traffic condition is determined.

Furthermore, even in a case that the data delivery agent having a plurality of the download servers and the data delivery agent having one download server are sporadically present and the respective data delivery agents have the contract with the menu server, it is possible to determine the access point using one of any methods described above depending on the data delivery agent.

Still furthermore, although in these embodiments, the music data is downloaded by the mobile telephone, a computer such as a personal computer, a workstation, and so on may download the music data. In this case, the computer is connected to the delivery server via a public telephone network. It is noted that in a case of a note book personal computer, it is considered to connect to the delivery server via a mobile telephone network using a mobile telephone only having a conventional communication function (and electrical mail function).

In addition, although in these embodiments, the content data is downloaded using the mobile telephone, it may be also possible to download using a PHS. In this case, the PHS is connected to the delivery server via a radio base station and a PHS network.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication terminal which sequentially connects to a menu server and a download server included in a data delivery server so as to receive and store content data, comprising:

a first establishing means which establishes a connection between said communication terminal and said menu server;

an obtaining means which obtains from said menu server download information including data information showing at least said content data to be downloaded and access point information showing an access point where a traffic is not congested to said download server;

a cutting-off means which cuts-off the connection between said communication terminal and said menu server when obtaining said download information;

a second establishing means which establishes a connection between said communication terminal and said download server based on said access point information included in said download information obtained by said obtaining means when the connection between said communication terminal and said menu server is severed by said cutting-off means;

a transmission means which transmits to said download server said data information included in said download information when connected to said download server;

a receiving means which receives said content data transmitted from said download server in accordance with said data information; and a storing means which stores said content data received by said receiving means.

2. A communication terminal which sequentially connects to a menu server and any one of a plurality of download servers included in a data delivery server so as to receive and store content data, comprising:

a first establishing means which establishes a connection between said communication terminal and said menu server;

an obtaining means which obtains from said menu server download information including data information showing at least said content data to be downloaded and access point information which is an access point to said one download server selected by said menu server and showing the access point where a traffic is not congested;

a cutting-off means which cuts-off the connection between said communication terminal and said menu server when obtaining said download information;

a second establishing means which establishes a connection between said communication terminal and said one download server based on said access point information included in said download information obtained by said obtaining means when the connection between said communication terminal and said menu server is severed by said cutting-off means;

a transmission means which transmit to said one download server said data information included in said download information when connected to said one download server;

a receiving means which receives said content data transmitted from said download server in accordance with said data information; and a storing means which stores said content data received by said receiving means.

3. A communication terminal which sequentially connects to a menu server and a download server included in a data delivery server so as to receive content data and store said content data into a connected recording medium, comprising:

a first establishing means which establishes a connection between said communication terminal and said menu server;

an obtaining means which obtains from said menu server download information including data information showing at least said content data to be downloaded and access point information showing an access point where a traffic is not congested to said download server;

a cutting-off means which cuts-off the connection between said communication terminal and said menu server when obtaining said download information;

a second establishing means which establishes a connection between said communication terminal and said download server based on said access point information included in said download information obtained by said obtaining means when the connection between said communication terminal and said menu server is severed by said cutting-off means;

a transmission means which transmit to said download server said data information included in said download information when connected to said download server;

a receiving means which receives said content data transmitted from said download server in accordance with said data information;

a connecting means which connects to said recording medium so as to transmit and receive at least said content data; and a storing control means which stores said content data received by said receiving means to said recording medium connected by said connecting means.

4. A communication terminal which sequentially connects to a menu server and any one of a plurality of download servers included in a data delivery server so as to receive content data and store said content data into a connected recording medium, comprising:

a first establishing means which establishes a connection between said communication terminal and said menu server;

an obtaining means which obtains from said menu server download information including data information showing at least said content data to be downloaded and access point information which is an access point to said one download server selected by said menu server and showing the access point where a traffic is not congested;

a cutting-off means which cuts-off the connection between said communication terminal and said menu server when obtaining said download information;

a second establishing means which establishes a connection between said communication terminal and said one download server based on said access point information included in said download information obtained by said obtaining means when the connection between said communication terminal and said menu server is severed by said cutting-off means;

a transmission means which transmit to said one download server said data information included in said download information when connected to said one download server; and a receiving means which receives said content data transmitted from said one download server in accordance with said data information;

a connecting means which connects to said recording medium so as to transmit and receive at least said content data; and a storing control means which stores said content data received by said receiving means to said recording medium connected by said connecting means.

* * * * *